United States Patent
Lim et al.

(10) Patent No.: US 10,663,825 B2
(45) Date of Patent: May 26, 2020

(54) LIQUID CRYSTAL DEVICE

(71) Applicant: LG Chem, Ltd., Seoul (KR)

(72) Inventors: Eun Jung Lim, Daejeon (KR); Sung Joon Min, Daejeon (KR); Jung Sun You, Daejeon (KR); Jung Woon Kim, Daejeon (KR); Jin Hong Kim, Daejeon (KR); Dong Hyun Oh, Daejeon (KR)

(73) Assignee: LG Chem, Ltd. (KR)

( * ) Notice: Subject to any disclaimer, the term of this patent is extended or adjusted under 35 U.S.C. 154(b) by 47 days.

(21) Appl. No.: 15/563,053

(22) PCT Filed: Mar. 31, 2016

(86) PCT No.: PCT/KR2016/003306
§ 371 (c)(1),
(2) Date: Sep. 29, 2017

(87) PCT Pub. No.: WO2016/159672
PCT Pub. Date: Oct. 6, 2016

(65) Prior Publication Data
US 2018/0373068 A1    Dec. 27, 2018

(30) Foreign Application Priority Data

Mar. 31, 2015 (KR) .................. 10-2015-0045015
Mar. 30, 2016 (KR) .................. 10-2016-0038645

(51) Int. Cl.
*C09K 19/54* (2006.01)
*G02F 1/137* (2006.01)
(Continued)

(52) U.S. Cl.
CPC ............ *G02F 1/137* (2013.01); *G02F 1/1334* (2013.01); *G02F 1/1375* (2013.01);
(Continued)

(58) Field of Classification Search
CPC ...... G02F 1/137; G02F 1/1334; G02F 1/1375; G02F 1/13743; G02F 1/13725;
(Continued)

(56) References Cited

U.S. PATENT DOCUMENTS

2002/0047104 A1    4/2002  Igawa et al.
2007/0195034 A1    8/2007  Hayashi et al.
(Continued)

FOREIGN PATENT DOCUMENTS

CN    103635561 A    3/2014
CN    103930820 A    7/2014
(Continued)

OTHER PUBLICATIONS

Extended European Search Report for Application No. 16773453.2 dated Sep. 11, 2018, 8 pages.
(Continued)

*Primary Examiner* — Anthony J Frost
(74) *Attorney, Agent, or Firm* — Lerner, David, Littenberg, Krumholz & Mentlik, LLP

(57) ABSTRACT

The present application relates to a liquid crystal device. The liquid crystal device of the present application may realize a transparent white state, a transparent black state and a scattering state according to a frequency and/or level of an applied voltage. The liquid crystal device may be applied to, for example, a window of a vehicle, a smart window, a window protective film, a display, a light cutoff panel for a display, an active retarder for a 3D image display or a viewing angle controlling film.

14 Claims, 29 Drawing Sheets

(51) Int. Cl.
*G02F 1/1334* (2006.01)
*C09K 19/00* (2006.01)
*G09G 3/36* (2006.01)

(52) U.S. Cl.
CPC ...... *G02F 1/13725* (2013.01); *G02F 1/13743* (2013.01); *C09K 19/00* (2013.01); *G02F 2001/13345* (2013.01); *G02F 2001/13756* (2013.01); *G02F 2202/043* (2013.01); *G02F 2202/06* (2013.01); *G02F 2202/16* (2013.01); *G09G 3/36* (2013.01)

(58) Field of Classification Search
CPC ..... G02F 2202/043; G02F 2001/13345; G02F 2202/16; G02F 2202/06; G02F 2001/13756; G09G 3/36; C09K 19/00
See application file for complete search history.

(56) References Cited

U.S. PATENT DOCUMENTS

| | | | |
|---|---|---|---|
| 2009/0135319 A1 | 5/2009 | Veerasamy | |
| 2011/0102711 A1 | 5/2011 | Sutherland et al. | |
| 2012/0091925 A1 | 4/2012 | Uehara et al. | |
| 2013/0012654 A1* | 1/2013 | Harding | B82Y 30/00 524/606 |
| 2013/0208197 A1 | 8/2013 | Kim et al. | |
| 2014/0106089 A1 | 4/2014 | Lee et al. | |
| 2014/0160384 A1 | 6/2014 | Li et al. | |
| 2014/0226096 A1* | 8/2014 | Taheri | G02F 1/13306 349/33 |
| 2014/0285751 A1 | 9/2014 | Min et al. | |
| 2015/0331264 A1 | 11/2015 | Min et al. | |
| 2016/0115389 A1 | 4/2016 | Lim et al. | |

FOREIGN PATENT DOCUMENTS

| | | | |
|---|---|---|---|
| CN | 103988121 A | | 8/2014 |
| GB | 2252171 A | | 7/1992 |
| JP | H05181156 A | | 7/1993 |
| JP | H07043661 A | | 2/1995 |
| JP | 2005276822 A | | 10/2005 |
| JP | 2006152290 A | | 6/2006 |
| JP | 2007219413 A | | 8/2007 |
| JP | 4896497 B2 | | 3/2012 |
| KR | 10-2008-0097839 | * | 11/2008 |
| KR | 20080097839 A | | 11/2008 |
| KR | 20140077861 A | | 6/2014 |
| KR | 20150007998 A | | 1/2015 |
| WO | 2014126974 A1 | | 8/2014 |

OTHER PUBLICATIONS

Search report from International Application No. PCT/KR2016/003306, dated Jul. 22, 2016.
Written Opinion of the International Searching Authority from PCT/KR2016/003306, dated Jul. 22, 2016.
U.S. Appl. No. 15/563,045, filed Sep. 29, 2017.
Search report from International Application No. PCT/KR2016/003303, dated Jul. 29, 2016.
Written Opinion of the International Searching Authority from PCT/KR2016/003303, dated Jul. 29, 2016.
Chinese Search Report for Application No. 201680025103.0, dated Feb. 27, 2020, pp. 1-3.

* cited by examiner

LIQUID CRYSTAL DEVICE

CROSS-REFERENCE TO RELATED APPLICATIONS

The present application is a national phase entry under 35 U.S.C. § 371 of International Application No. PCT/KR2016/003306 filed Mar. 31, 2016, which claims priority from Korean Patent Application No. 10-2015-0045015, filed on Mar. 31, 2015, and Korean Patent Application No. 10-2016-0038645, filed on Mar. 30, 2016, the disclosures of which are incorporated herein by reference in their entirety.

TECHNICAL FIELD

The present application relates to a liquid crystal device and a use thereof.

BACKGROUND ART

A liquid crystal device may control light transmittance by switching an alignment state of liquid crystals by an external signal such as an applied voltage and therefore may be used as a variable transmission device. Such a liquid crystal device may also be applied to a light cutoff panel for organic light emitting diodes (OLED) or various light cutoff products for vehicles and smart windows as well as displays for various information devices.

The light cutoff or light transmitting mechanism of a liquid crystal device may be classified into transparent white, transparent black and scattering states, and a typical liquid crystal device is a double state device that switches between transparent white and transparent black states, or between transparent white and scattering states. Here, the transparent white state may be a state with high parallel light transmittance and low haze, the transparent black state may be a state with low parallel light transmittance and low haze, and the scattering state may be a state with low parallel light transmittance and high haze.

A liquid crystal device applied to a display may generally switch between transparent white and transparent black states, and a device switching between transparent white and scattering states utilizes, for example, the so-called polymer dispersed liquid crystals (PDLC) as disclosed in Patent Document 1.

PRIOR ART DOCUMENT

<Patent Document>

Patent Document 1: Korean Unexamined Patent Publication No. 2014-0077861

DISCLOSURE

Technical Problem

The present application provides a liquid crystal device and a use thereof.

Technical Solution

The present application relates to a triple state liquid crystal device. The term "triple state liquid crystal device" used herein may be a device capable of realizing all of the transparent white state, transparent black state, and scattering state and capable of inter-switching among the three states.

The term "transparent white state" used herein may be a state in which a liquid crystal device or a liquid crystal layer has a parallel light transmittance of 25% or more and a haze of 5% or less and may be called a first state. Also, the term "transparent black state" may refer to a state in which a parallel light transmittance is 15% or less and a haze is 5% or less and may be called a second state. The term "scattering state" may be a state in which a parallel light transmittance is 10% or less and haze is 80% or more and may be called a third state.

Here, in the first state, the parallel light transmittance may be 40% or more, 45% or more, 50% or more, 55% or more, 60% or more, 65% or more, 70% or more, 75% or more, 80% or more, 85% or more, or 90% or more, and the haze may be 3% or less, 2.5% or less, 2% or less, 1.5% or less, or 1% or less. In the second state, the parallel light transmittance may be 20% or less, 15% or less, 10% or less, or 5% or less, and the haze may be 3% or less, 2.5% or less, 2% or less, 1.5% or less, or 1% or less. In the third state, the parallel light transmittance may be 5% or less, and the haze may be 90% or more, or 95% or more.

In the present application, the transmittance, parallel light transmittance and haze values are measured according to the ASTM D1003 specification.

The liquid crystal device of the present application includes a liquid crystal layer. The term "liquid crystal layer" may refer to a layer including at least a liquid crystal compound.

The liquid crystal layer of the present application may have a parallel conductivity of $1.0 \times 10^{-4}$ μS/cm or more. It was confirmed that, when the liquid crystal layer is adjusted to have the above range of parallel conductivity, the liquid crystal layer is able to realize all of the first to third states according to the level and frequency of an applied voltage and thus to switch from one state to another among the three states. The parallel conductivity of the liquid crystal layer, in another exemplary embodiment, may be $2.0 \times 10^{-4}$ μS/cm or more, $3.0 \times 10^{-4}$ μS/cm or more, $4.0 \times 10^{-4}$ μS/cm or more, $5.0 \times 10^{-4}$ μS/cm or more, $6.0 \times 10^{-4}$ μS/cm or more, $7.0 \times 10^{-4}$ μS/cm or more, $8.0 \times 10^{-4}$ μS/cm or more, $9.0 \times 10^{-4}$ μS/cm or more, or $1.0 \times 10^{-3}$ μS/cm or more. The parallel conductivity, in another exemplary embodiment, may be $5.0 \times 10^{-2}$ μS/cm or less, $3.0 \times 10^{-2}$ μS/cm or less, $1.0 \times 10^{-2}$ μS/cm or less, $9.0 \times 10^{-3}$ μS/cm or less, $7.0 \times 10^{-3}$ μS/cm or less, $5.0 \times 10^{-3}$ μS/cm or less, $3.0 \times 10^{-3}$ μS/cm or less, or $2.5 \times 10^{-3}$ μS/cm or less.

The term "parallel conductivity" used herein is conductivity measured while a voltage is applied to the liquid crystal layer and may be a value measured along the direction of an electric field while a voltage is applied to cause the direction of the electric field created by the applied voltage to be substantially parallel to an optical axis of the liquid crystal layer. Here, the measurement frequency of the applied voltage may be 60 Hz, and the measurement voltage may be 0.5 V.

Meanwhile, vertical conductivity that will be described below may also be conductivity measured while a voltage is applied to the liquid crystal layer and may be a value measured along a direction of an electric field while a voltage is applied to cause the direction of the electric field created by the applied voltage to be substantially perpendicular to an optical axis of the liquid crystal layer. Here, the measurement frequency of the applied voltage may be 60 Hz, and the measurement voltage may be 0.5 V.

The optical axis of the liquid crystal layer may be determined by the type of liquid crystal compound. For example, when molecules of the liquid crystal compound are formed in a rod shape, the optical axis of the liquid crystal layer may be the major axis direction of the molecules of the liquid crystal compound included in the liquid crystal layer that are aligned. For example, when the molecules of the liquid crystal compound in the liquid crystal layer are vertically aligned to be parallel to the thickness direction of the liquid crystal layer, the parallel conductivity may be conductivity measured along the thickness direction while a voltage is applied to create an electric field along the thickness direction of the liquid crystal layer. Contrarily, when molecules of the liquid crystal compound in the liquid crystal layer are formed in a rod shape and horizontally aligned in the liquid crystal layer, the vertical conductivity may be conductivity measured in the thickness direction while a voltage is applied to create an electric field in the thickness direction of the liquid crystal layer.

Meanwhile, unless particularly defined otherwise, in the present application, the vertical or parallel conductivity as described above may be a value obtained by converting the conductivity measured at room temperature by each method described above while a voltage is applied to the liquid crystal layer at a measurement frequency of 60 Hz and a voltage of 0.5 V into that corresponding to a liquid crystal layer having an area of 1 cm² (width: 1 cm, length: 1 cm) and a thickness of 1 cm.

In exemplary embodiments that will be described below, an actual value measured on a liquid crystal layer having an area of 9 cm² (width: 3 cm, length: 3 cm) and a thickness of 15 μm was converted into that corresponding to the liquid crystal layer having an area of 1 cm² (width: 1 cm, length: 1 cm) and a thickness of 1 cm.

Formulas applied to the above conversion are shown as Formulas 1 to 3.

$C=1/\rho$ [Formula 1]

$R=1/CR$ [Formula 2]

$R=\rho \times D/A$ [Formula 3]

In Formulas 1 to 3, C is parallel or vertical conductivity, ρ is resistivity of the liquid crystal layer, CR is an actual value of the parallel or vertical conductivity, R is resistance of the liquid crystal layer, D is a thickness of the liquid crystal layer, and A is an area of the liquid crystal layer.

For example, after the actual value (CR) of conductivity measured on a liquid crystal layer having predetermined thickness and area is substituted into Formula 2 to obtain resistance (R), the resistivity (ρ) of a liquid crystal layer (area: 1 cm² (=width: 1 cm, length: 1 cm), thickness: 1 cm) may be calculated using the resistance (R) and Formula 3 and then substituted into Formula 1 to obtain vertical or parallel conductivity.

The term "horizontal alignment of the liquid crystal layer or liquid crystal compound" used herein may be a state in which rod-shaped molecules of the liquid crystal compound are substantially parallel-aligned, and for example, in-plane retardation (Rin) according to Formula A ranges from 150 nm to 3,000 nm, thickness-direction retardation (Rth) according to Formula B ranges from 0 nm to 100 nm or 0 nm to 50 nm, and the term "vertical alignment of the liquid crystal layer or liquid crystal compound" may be a state in which rod-shaped molecules of the liquid crystal compound are substantially vertically-aligned, and for example, the in-plane retardation (Rin) may range from 0 nm to 100 nm or 0 nm to 50 nm, and the thickness-direction retardation (Rth) may range from 150 nm to 3000 nm.

$Rin=d(nx-ny)$ [Formula A]

$Rth=d(nz-ny)$ [Formula B]

In Formulas A and B, d is the thickness of a liquid crystal layer, nx is the refractive index in the slow axis direction on the planar surface of a liquid crystal layer, ny is the refractive index in the direction perpendicular to the slow axis, and nz is the refractive index in the thickness direction, that is, the direction perpendicular to both the slow axis and the direction perpendicular thereto. The term "refractive index" used herein may be, unless particularly defined otherwise, a refractive index with respect to light with 550 nm wavelength.

In addition, as described above, in the present application, conductivity may be, unless particularly defined otherwise, a value obtained by converting conductivity at room temperature measured under conditions including the measurement frequency of 60 Hz and the measurement voltage of 0.5 V into that corresponding to a liquid crystal layer having an area of 1 cm² (width: 1 cm, length: 1 cm) and a thickness of 1 cm with the conductivity measured using a measurement instrument (LCR meter, Aglient, E4980A) according to the manufacturer's manual. Meanwhile, when measurement temperatures of physical properties described in the specification affects the above value, unless particularly defined otherwise, the corresponding physical property is a value measured at room temperature. Here, the term "room temperature" may be a natural temperature which is neither elevated nor decreased, that is, any one temperature between approximately 10° C. to 30° C., for example, approximately 23° C. or 25° C.

A method of controlling the conductivity of the liquid crystal layer is known, and for example, as will be described below, the conductivity can be controlled by adding a suitable additive, for example, ionic impurities, an ionic liquid, a salt, a reactive monomer, an initiator or a dichroic dye to the liquid crystal layer.

Here, a ratio (PC/VC) of the parallel conductivity (PC) to the vertical conductivity (VC) of the liquid crystal layer may be approximately 0.2 or more, 0.25 or more, 0.3 or more, 0.35 or more, 0.4 or more, 0.45 or more, 0.5 or more, 0.55 or more, 0.6 or more, 0.65 or more, or 0.7 or more. In addition, the ratio (PC/VC) may be approximately 2.5 or less, 2.0 or less, 1.5 or less, or 1.0 or less. Here, a ratio (VC/PC) of the vertical conductivity (VC) to the parallel conductivity (PC) of the liquid crystal layer may be approximately 2.0 or less, 1.9 or less, 1.8 or less, 1.7 or less, 1.6 or less, 1.5 or less, 1.4 or less, 1.3 or less, 1.2 or less, 1.1 or less, or 1.0 or less. In addition, the ratio (VC/PC) may be approximately 0.5 or more, 0.3 or more, 0.2 or more, or 0.1 or more. The conductivity (PC and VC) values can also be controlled by suitably adding the above-described additives. Controlling the conductivity ratios (VC/PC and/or PC/VC) as described above may be advantageous in terms of the driving efficiency of the liquid crystal device.

The liquid crystal device may be in the first or second state in the initial state. The term "initial state" used herein may refer to a state in which an external signal for driving a liquid crystal compound such as a voltage is not applied.

In the initial state as described above, the liquid crystal device may switch to a different state (any one among the first to third states) by the application of a voltage with a predetermined frequency or by changing the level and/or frequency of an applied voltage or removing an applied voltage.

In the liquid crystal device, applied frequency (F1) and voltage (V1) for realizing the first or second state and applied frequency (F2) and voltage (V2) for realizing the third state may satisfy the following Conditions 1 and/or 2.

$$F1>F2 \quad \text{[Condition 1]}$$

$$V1 \leq V2. \quad \text{[Condition 2]}$$

In other words, the applied frequency (F1) required to realize the second state when the initial state is the first state or the applied frequency (F1) required to realize the first state when the initial state is the second state is always higher than the applied frequency (F2) required to realize the third state under Condition 1. In one exemplary embodiment, the ratio between the applied frequencies (F1/F2) may be more than 1, for example, 1.5 or more, 2 or more, 2.5 or more, or 3 or more. The ratio (F1/F2) may be, in another exemplary embodiment, 10 or less, 9 or less, 8 or less, 7 or less, 6 or less, 5 or less, or 4.5 or less.

Meanwhile, the applied voltage (V1) required to realize the second state when the initial state is the first state or the applied voltage (V1) required to realize the first state when the initial state is the second state may be smaller than or the same as the applied voltage (V2) required to realize the third state under Condition 2. In one exemplary embodiment, the ratio between the applied voltages (V2/V1) may be 1 or more, 2 or more, 3 or more, 4 or more, 5 or more, or 5.5 or more. The ratio (V2/V1) may be, in another exemplary embodiment, 20 or less, 15 or less, or 10 or less.

The applied frequency (F1) required to realize the second state when the initial state is the first state or the applied frequency (F1) required to realize the first state when the initial state is the second state may be, for example, 90 Hz or more, 100 Hz or more, 150 Hz or more, 200 Hz or more, 250 Hz or more, or 300 Hz or more. The applied frequency (F1) may be, in another exemplary embodiment, 600 Hz or less, 500 Hz or less, or 400 Hz or less.

In addition, the applied frequency (F2) required to realize the third state may be 110 Hz or less, 100 Hz or less, 90 Hz or less, 80 Hz or less, 70 Hz or less, 60 Hz or less, 50 Hz or less, or 40 Hz or less. The applied frequency (F2) may be, in another exemplary embodiment, 10 Hz or more, or 20 Hz or more.

The applied voltage (V1) required to realize the second state when the initial state is the first state or the applied voltage (V1) required to realize the first state when the initial state is the second state may be, for example, 50V or less, 45V or less, 40V or less, 35V or less, 30V or less, 25V or less, 20V or less, or 15V or less. The applied voltage (V1) may be, in another exemplary embodiment, 5V or more.

The applied voltage (V2) required to realize the third state may be 50V or more or 65V or more. The applied voltage (V2) may be, in another exemplary embodiment, 200V or less, 150V or less, 100V or less, 80V or less, or 70V or less.

The applied frequencies (F1 and/or F2) and/or the applied voltages (V1 and/or V2) may be controlled, for example, by changing conductivity of the liquid crystal layer within the range satisfying Conditions 1 and/or 2.

In one exemplary embodiment, the triple state liquid crystal device may satisfy the following Formula A.

$$20 \leq H1/H2 \quad \text{[Formula A]}$$

In Formula A, H1 is haze of the triple state liquid crystal device while a frequency of 30 Hz and a voltage of 60 V are applied, and H2 is haze of the triple state liquid crystal device while no voltage is applied or a frequency of 100 Hz and a voltage of 10 V are applied.

In Formula A, H1/H2 may be a ratio of the haze (H1) of the liquid crystal device realized in the third state to the haze (H2) of the liquid crystal device realized in the first or second state. In the present application, a haze difference in the range of Formula A may be realized by controlling the conductivity of the liquid crystal layer in the above range. In Formula A, H1/H2 may be, in another exemplary embodiment, 25 or more, 30 or more, 35 or more, 40 or more, 45 or more, 50 or more, 55 or more, 60 or more, 65 or more, 70 or more, 75 or more, 80 or more, 85 or more, or 90 or more. In Formula A, H1/H2 may be, in another exemplary embodiment, 100 or less, or 98 or less, or 96 or less.

In one exemplary embodiment, the liquid crystal device may satisfy Formula B.

$$5 \leq T1/T2 \quad \text{[Formula B]}$$

In Formula B, T1 is parallel light transmittance of the triple state liquid crystal device while no voltage is applied or a frequency of 100 Hz and a voltage of 10 V are applied, and T2 is haze of the triple state liquid crystal device while a frequency of 30 Hz and a voltage of 60 V are applied.

In Formula B, T1 may be parallel light transmittance in the first state, and T2 may be parallel light transmittance in the second or third state. In the present application, a difference in parallel light transmittance in the range of Formula B may be realized by controlling the conductivity of the liquid crystal layer within the above range. In Formula B, T1/T2 may be, in another exemplary embodiment, 10 or more, 15 or more, 20 or more, 25 or more, 30 or more, 35 or more, 40 or more, 45 or more, 50 or more, 55 or more, 60 or more, 65 or more, 70 or more, 75 or more, 80 or more, 85 or more, or 90 or more. In Formula B, T1/T2 may be, in another exemplary embodiment, 100 or less, or 98 or less, or 96 or less.

The liquid crystal layer of the liquid crystal device may include at least a liquid crystal compound. As a liquid crystal compound, a suitable type may be selected depending on use without particular limitation. In one exemplary embodiment, as a liquid crystal compound, a nematic liquid crystal compound may be used. The liquid crystal compound may be an unreactive liquid crystal compound. The term "unreactive liquid crystal compound" may be a liquid crystal compound without having a polymerizable group. Here, as a polymerizable group, an acryloyl group, an acryloyloxy group, a methacryloyl group, a methacryloyloxy group, a carboxyl group, a hydroxyl group, a vinyl group, or an epoxy group may be used without limitation, and a conventional functional group known as a polymerizable group may be included.

The liquid crystal compound included in the liquid crystal layer may have positive or negative dielectric anisotropy. The term "dielectric anisotropy" may refer to a difference between extraordinary dielectric anisotropy (permittivity in the major axis direction) or ordinary dielectric anisotropy (permittivity in the minor axis direction) of the liquid crystal compound. The dielectric anisotropy of the liquid crystal compound may be, for example, less than ±40, ±30, ±10, ±7, ±5 or ±3. Controlling the dielectric anisotropy of the liquid crystal compound within the above range may be advantageous in terms of the driving efficiency of the liquid crystal device.

Refractive index anisotropy of the liquid crystal compound present in the liquid crystal layer may be suitably selected by considering a desired physical property, for example, a haze characteristic of the liquid crystal device. The term "refractive index anisotropy" may refer to a difference between the extraordinary refractive index and the ordinary refractive index of the liquid crystal compound. The refractive index anisotropy of the liquid crystal compound may be, for example, in a range of 0.1 or more, 0.12 or more, or 0.15 or more, and 0.23 or less, 0.25 or less, or 0.3 or less. When the refractive index anisotropy of the liquid crystal compound satisfies the above range, for example, a general transmission-mode device having an excellent haze characteristic may be realized.

The liquid crystal layer may include a suitable additive for controlling conductivity. The additive may be, for example, an ionic impurity, an ionic liquid, a, salt, a reactive monomer, an initiator, or a dichroic dye. The compounds capable of controlling the conductivity of the liquid crystal layer are known. For example, as an ionic impurity, a 2,2,6,6-tetramethylpiperidine-1-oxyl free radical (TEMPO), as an ionic liquid, [1-butyl-3-methylimideazolium]$BF_4$ (BMIN-$BF_4$), as a salt, cetrimonium bromide (CTAB), cetrimonium iodide (CTAI) or cetrimonium triiodide ($CTAI_3$), as a reactive monomer, a reactive mesogen having a mesogen group well mixed with liquid crystals, as an initiator, for example, 2,4,6-Trimethylbenzoyl-diphenyl-phosphineoxide (TPO), and as a dichroic dye, for example, an azo-based dye such as X12 produced by BASF may be used, but the present invention is not limited thereto. A ratio of the compound in the liquid crystal layer may be suitably selected by considering a desired conductivity and an alignment characteristic of the liquid crystal compound.

In one exemplary embodiment, the liquid crystal layer may include a reactive mesogen as an additive for controlling the conductivity to effectively ensure the above-described conductivity and excellent solubility in liquid crystals, reduce the difference in diffusion characteristic, and have excellent physical properties. The term "reactive mesogen" may be a liquid crystal compound having one or more polymerizable functional groups. For example, when the unreactive liquid crystal compound is mixed with the reactive mesogen as a conductivity regulator, the above-described conductivity may be effectively achieved and physical properties of the liquid crystal layer may be stably maintained. The reactive mesogen may be present in an unreated state, that is, an unpolymerized state in the liquid crystal layer, and when needed, may be at least partially polymerized.

As a reactive mesogen that can be used in the present application, a reactive mesogen in which a polymerizable functional group is linked to a mesogen core including 1 to 6, 1 to 5, 1 to 4 or 1 to 3 aromatic ring structures or aliphatic ring structures may be used. Here, when there are two or more aromatic or aliphatic ring structures, two or more ring structures may be directly linked to each other or linked by a linker, thereby constituting a mesogen core. Here, a linker may be an alkylene group having 1 to 10, 1 to 8 or 1 to 6 carbon atoms, an ester group (—C(=O)—O— or —O—C(=O)—), an ether group, an alkenylene group having 2 to 10, 2 to 8 or 2 to 6 carbon atoms, an oxyalkylene group having 1 to 10, 1 to 8 or 1 to 6 carbon atoms (—O-alkylene group-, -alkylene group-O— or alkylene group-O-alkylene group-). Here, the aromatic ring structure may be an aromatic ring structure having 6 to 20, 6 to 16 or 6 to 12 carbon atoms, and for example, a benzene group. Also, the aliphatic ring structure may have 6 to 20, 6 to 16 or 6 to 12 carbon atoms, and may be, for example, a cyclohexane structure. Meanwhile, the reactive mesogen may include 1 to 10, 1 to 8, 1 to 6, 1 to 4 or 1 or 2 polymerizable groups. Such a polymerizable group may be linked to the mesogen core. The polymerizable group may be directly linked or linked using a suitable spacer to the mesogen core, the spacer being the same type as the linker. In addition, the polymerizable functional group may be an acryloyl group, an acryloyloxy group, a methacryloyl group, a methacryloyloxy group, a carboxyl group, a hydroxyl group, a vinyl group, or an epoxy group, but the present invention is not limited thereto.

In the present application, the ratio of the reactive mesogen in the liquid crystal layer may be controlled within the range that can achieve the conductivity. For example, the reactive mesogen may be included at 1 to 30 parts by weight with respect to 100 parts by weight of the unreactive liquid crystal compound. The ratio of the reactive mesogen may be, in another exemplary embodiment, 5 parts by weight or more and 25 parts by weight or less, 20 parts by weight or less, or 15 parts by weight or less.

The liquid crystal layer may not include an ionic compound, for example, the above-described ionic liquid or salt. While such an ionic compound is widely known as an additive for controlling the conductivity of the liquid crystal layer, the inventors identified that such a compound degrades physical properties of the liquid crystal layer due to having low solubility with respect to the liquid crystal compound. Thus, the ratio of the ionic compound in the liquid crystal layer may be 2 wt % or less, 1.5 wt % or less, 1 wt % or less, or approximately 0.7 wt % or less. Since the ionic compound is an arbitrary component, the lower limit of the ratio thereof is 0 wt %.

The liquid crystal layer may further include a dichroic dye. The dichroic dye may improve, for example, the shading rate of the liquid crystal device and thus contribute to variable transmittance. The term "dye" may be a material capable of intensively absorbing and/or modifying light within at least a partial or entire range in a visible region, for example, a wavelength range from 400 nm to 700 nm, and the term "dichroic dye" may be a material capable of anisotropically absorbing light in at least a partial or entire range of the visible region.

As a dichroic dye, for example, a conventional dye known to be aligned depending on an aligned state of the liquid crystal compound due to a so-called host-guest effect may be selected and used. The dichroic dye may be, for example, a black dye. Such a dye is known, for example, as an azo dye or an anthraquinone dye, but the present invention is not limited thereto.

As a dichroic dye, a dye having a dichroic ratio, that is, a value obtained by dividing absorption of polarized light parallel to the major axis of the dichroic dye by absorption of polarized light parallel to the direction perpendicular to the major axis direction, is 5 or more, 6 or more, or 7 or more may be used. The dye may satisfy the dichroic ratio within a wavelength range of the visible region, for example, of at least a partial wavelength range or any one wavelength between approximately 380 nm to 700 nm or approximately 400 nm to 700 nm. The upper limit of the dichroic ratio may be, for example, approximately 20 or less, 18 or less, 16 or less, or 14 or less.

A ratio of the dichroic dye in the liquid crystal layer may be selectively selected depending on a target physical property, for example, the variable transmittance characteristic. For example, the dichroic dye may be included in the liquid crystal layer at 0.01 wt % or more, 0.1 wt % or more, 0.2 wt % or more, 0.3 wt % or more, 0.4 wt % or more, 0.5 wt % or more, 0.6 wt % or more, 0.7 wt % or more, 0.8 wt % or more, 0.9 wt % or more, or 1.0 wt % or more. The upper limit of the ratio of the dichroic dye in the liquid crystal layer may be, for example, 2 wt % or less, 1.9 wt % or less, 1.8 wt % or less, 1.7 wt % or less, 1.6 wt % or less, 1.5 wt % or less, 1.4 wt % or less, 1.3 wt % or less, 1.2 wt % or less, or 1.1 wt % or less.

The liquid crystal layer may further include a polymer network. The polymer network may serve as, for example, a spacer for maintaining a gap in the liquid crystal layer. The polymer network may be phase-separated from the liquid crystal compound. The polymer network may be distributed in a continuous phase liquid crystal compound, and in other words, may be included in the liquid crystal layer in a so-called polymer network liquid crystal (PNLC) structure, or in a structure in which a liquid crystal region containing the liquid crystal compound is distributed, that is, a so-called polymer dispersed liquid crystal (PDLC) structure.

The polymer network may be, for example, the network of a precursor including a polymerizable compound. Therefore, the polymer network may include a polymerizable compound in a polymerized state. As a polymerizable compound, a non-crystalline compound not exhibiting crystallinity may be used. As a polymerizable compound, a compound having one or more polymerizable functional group known to form a polymer network of the so-called PDLC or PNLC device may be used and, when needed, a non-polymerizable compound without a polymerizable functional group may be used. As a polymerizable compound included in the precursor, an acrylate compound may be used, but the present invention is not limited thereto.

A ratio of the polymer network in the liquid crystal layer may be suitably selected by considering a target physical property, for example, a haze or transmittance characteristic of the liquid crystal device. The polymer network may be included in the liquid crystal layer at a ratio of, for example, 40 wt % or less, 38 wt % or less, 36 wt % or less, 34 wt % or less, 32 wt % or less, or 30 wt % or less. The lower limit of the ratio of the polymer network in the liquid crystal layer may be, but is not particularly limited to, for example, 0.1 wt % or more, 1 wt %, 2 wt % or more, 3 wt % or more, 4 wt % or more, 5 wt % or more, 6 wt % or more, 7 wt % or more, 8 wt % or more, 9 wt % or more, or 10 wt % or more.

The liquid crystal device of the present application may further include, for example, two substrates, and the liquid crystal layer may be present between the substrates. As illustrated in FIG. 1, in the liquid crystal device, the two substrates 1011 and 1012 face each other, and the liquid crystal layer 102 may be present between the two substrates 1011 and 1012 facing each other.

A known material may be used as the substrate without particular limitation. For example, an inorganic or plastic film such as a glass film, a crystalline or non-crystalline silicon film, or a quartz or indium tin oxide (ITO) film may be used. An optically isotropic substrate, an optically anisotropic substrate such as a retardation layer or a polarizing plate or color filter substrate may be used as the substrate.

A substrate including triacetyl cellulose (TAC); a cyclo olefin copolymer (COP) such as a norbornene derivative; poly(methyl methacrylate (PMMA); polycarbonate (PC); polyethylene (PE); polypropylene (PP); polyvinyl alcohol (PVA); diacetyl cellulose (DAC); polyacrylate (Pac); poly ether sulfone (PES); polyetheretherketon (PEEK); polyphenylsulfone (PPS), polyetherimide (PEI); polyethylenemaphthatlate (PEN); polyethyleneterephtalate (PET); polyimide (PI); polysulfone (PSF); polyarylate (PAR) or an amorphous fluorine resin may be used as a plastic substrate, but the present invention is not limited thereto. The substrate may include, as necessary, gold, silver, a coating layer of a silicon compound such as silicon dioxide or silicon monooxide, or a coating layer of a reflection preventive layer.

The substrate may be a substrate having a liquid crystal alignment characteristic. The term "substrate having a liquid crystal alignment characteristic" may be a substrate to which an alignment capability is provided to affect the alignment of an adjacent liquid crystal compound, for example, to align an adjacent liquid crystal compound in a predetermined direction. As the liquid crystal layer is present between the two substrates having a liquid crystal alignment characteristic, a suitable initial alignment state may be maintained. In the liquid crystal device, the two substrates facing each other may be, for example, a substrate having a vertical or horizontal alignment characteristic. The term "substrate having a vertical or horizontal alignment characteristic" used herein may be a substrate having an alignment characteristic such that an adjacent liquid crystal compound can be aligned in the vertical or horizontal direction.

As a substrate having a liquid crystal alignment characteristic, for example, a substrate having an alignment film may be used. Accordingly, the liquid crystal device may further include an alignment film adjacent to the liquid crystal layer. For example, as shown in FIG. 2, alignment films 201 and 202 may be present on the two substrates 1011 and 1012 facing each other, respectively, toward the liquid crystal layer 102. Each alignment film may be, for example, a touch alignment film such as a rubbing alignment film or an alignment film known to exhibit alignment characteristics by a non-touch method such as radiation of linearly polarized light due to including an optical alignment film compound.

Another example of the alignment-induced substrate may be a substrate having a self-liquid crystal alignment characteristic. For example, a substrate having a hydrophilic surface may be used as a substrate having vertical alignment. The substrate having a hydrophilic surface may have a wetting angle with respect to water of, for example, approximately 0 degrees to 50 degrees, 0 degrees to 40 degrees, 0 degrees to 30 degrees, 0 degrees to 20 degrees, or 0 degrees to 10 degrees, or 10 degrees to 50 degrees, 20 degrees to 50 degrees, or 30 degrees to 50 degrees. Here, the method of measuring the wetting angle of the substrate with respect to water is not particularly limited, and a method of measuring a wetting angle known in the art, for example, using a DSA100 instrument produced from KRUSS according to the manufacturer's manual may be used. To allow the substrate to have a hydrophilic surface, for example, hydrophilic treatment may be performed on the substrate, or a substrate including a hydrophilic functional group may be used. The hydrophilic treatment may be corona treatment, plasma treatment or alkali treatment.

The liquid crystal device may further include an electrode layer, for example, an electrode layer adjacent to the liquid crystal layer. For example, as shown in FIG. 3, electrode layers 301 and 302 may be present on the two substrates 1011 and 1012 facing each other, respectively, toward the liquid crystal layer 102. When the alignment films are present on both surfaces of the liquid crystal layer of the substrate, a substrate, an electrode layer and an alignment film may be sequentially presented. Such an electrode layer may be provided to the liquid crystal layer to convert an aligned state of a liquid crystal compound in the liquid crystal layer. The electrode layer may be formed by depositing a conductive polymer, a conductive metal, a conductive nanowire or a metal oxide such as ITO. The electrode layer may be formed to have transparency. In this field, various materials and methods for forming a transparent electrode layer may be known, and all of the methods may be applied. When needed, the electrode layer formed on a surface of the substrate may be suitably patterned.

The liquid crystal layer, when needed, may further include a polarizing layer disposed on one side or both sides of the liquid crystal layer. The polarizing layer may serve to control optical transmittance of the liquid crystal device according to the alignment state of the liquid crystal compound. A known material may be used without particular limitation as the polarizing layer, and, for example, a poly (vinyl alcohol)(PVA)-based polarizing layer, a liquid crystal alignment layer such as a lyotropic liquid crystal (LLC) or a reactive mesogen (RM), and an anisotropic dye may be applied. When polarizing layers are disposed on both sides of the liquid crystal layer, the relationship between the optical transmission axes of the polarizing layers is not particularly limited and may be controlled according to a desired mode.

The liquid crystal device, when needed, may further include a known arbitrary component in addition to the above-described components.

The liquid crystal device may realize any one of the above-described first to third states depending on the frequency and/or level of an applied voltage and switch to another state by a change of the frequency and/or level of the applied voltage or the removal thereof.

In each state, the alignment state of the liquid crystal compound is not particularly limited, and for example, a suitable alignment may be selected according to the presence or absence of a dichroic dye in the polarizing layer or liquid crystal layer.

In one exemplary embodiment, the liquid crystal layer may be in a vertically aligned state in the first state. The vertically-aligned state may be a state in which liquid crystal compounds therein are substantially vertically-aligned and have the above-described in-plane and thickness-direction retardations (Rin and Rth).

The liquid crystal layer may be in a horizontally-, vertically-, twist- or hybrid-aligned state in the second state. Here, the horizontally-aligned state may be a state in which molecules of the liquid crystal compound therein are substantially horizontally-aligned, and have the above-described in-plane and thickness-direction retardations (Rin and Rth), the twist-aligned state may be a state in which horizontally-aligned liquid crystal compounds are rotated at a predetermined angle along a virtual helical axis, and the hybrid-aligned state may be a state in which two or more of the horizontally-, vertically- and twist-aligned states, and a splay-aligned state are present together.

The liquid crystal layer may be in an electrohydrodynamic instability (EHDI) state in the third state. In this state, the liquid crystal compound may be randomly aligned without a certain regularity and thereby inducing high haze.

As a realizable liquid crystal device, a device which is in the first state in the initial state and switches to a second state and/or third state according to the frequency and/or level of an applied voltage may be used.

In such a device, the liquid crystal layer may be vertically aligned in the first state, horizontally aligned in the second state, and EHDI in the third state. For example, such a device may provide a liquid crystal alignment capability using a vertical alignment film and may be realized using a liquid crystal compound having negative dielectric anisotropy as the liquid crystal compound. In this state, when needed, polarizing layers may be present on both sides of the liquid crystal layer.

As another realizable liquid crystal device, a device which is in the second state in the initial state and switches to the first state and/or third state according to the frequency and/or level of an applied voltage may be used.

In such a device, the liquid crystal layer may be horizontally aligned or twist-aligned or hybrid-aligned which is the same as being splay-aligned, vertically aligned in the first state, and in an EHDI state in the third state. Such a device may be realized, for example, using a horizontal alignment film and liquid crystals having positive dielectric anisotropy, using two alignment films with different alignment directions on both sides of the liquid crystal layer and liquid crystals having positive dielectric anisotropy, or by applying horizontally- and vertically-aligned films to both sides of the liquid crystal layer and using a liquid crystal compound having positive dielectric anisotropy as a liquid crystal compound. In this state, when needed, polarizing layers may be present on both sides of the liquid crystal layer.

The method of realizing a liquid crystal device having each of the structure is not particularly limited, and the above-described liquid crystal devices may be realized using a conventional method of manufacturing a liquid crystal device by controlling a process of controlling conductivity of the liquid crystal layer.

The present application may also relate to a method of manufacturing a liquid crystal device including a liquid crystal layer. The method of manufacturing a liquid crystal device may be the above-described method of manufacturing a liquid crystal device.

Therefore, the manufacturing method may include adjusting the parallel conductivity of the liquid crystal layer to be $1.0 \times 10^{-4}$ μS/cm or more. By the above procedure, the liquid crystal device may be formed to switch between the above-described first to third states.

Here, the method of controlling the conductivity of the liquid crystal layer is not particularly limited, and for example, a method of suitably selecting a type of material used herein, for example, a liquid crystal compound and/or dichroic dye, or adding the above-described salt component may be applied.

In the method of manufacturing a liquid crystal device, the above descriptions may be applied to other contents, for example, definitions of the first to third states or conditions of frequencies (F1 and F2) and/or voltages (V1 and V2) applied for driving.

The present application may also relate to a method of driving a liquid crystal device including a liquid crystal layer. The method of driving the liquid crystal device may be the same as that described above.

Therefore, the manufacturing method may include applying a voltage to a liquid crystal layer having a parallel conductivity of $1.0 \times 10^{-4}$ μS/cm or more and controlling the frequency or the level of the applied voltage for the liquid crystal device to realize any one of the first to third states described above. Also, the method may further include controlling a level of the applied voltage to switch from any one of the first to third states to another.

In the above method, the method of controlling a level of the applied frequency and/or voltage to drive the liquid crystal device is not particularly limited and may be performed according to the above-described conditions.

The present application may also relate to a use of the liquid crystal device, for example, as a light modulator that includes the liquid crystal device. Such a light modulator may be applied to various uses and may be applied to, for example, a window of a vehicle, a smart window, a window protective film, a display, a light cutoff panel for a display, an active retarder for a 3D image display, or a viewing angle controlling film.

Advantageous Effects

The present application relates to a liquid crystal device. The liquid crystal device of the present application may realize a transparent white state, a transparent black state and a scattering state according to the frequency and/or level of an applied voltage. The liquid crystal device may be applied to, for example, a window of a vehicle, a smart window, a window protective film, a display, a light cutoff panel for a display, an active retarder for a 3D image display or a viewing angle controlling film.

DESCRIPTION OF REFERENCE NUMERALS

Figure 1:
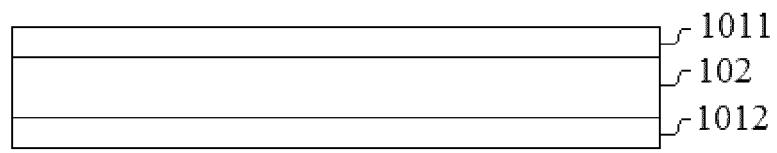
FIGS. 1 to 3 illustrate a liquid crystal device.
Figure 2:
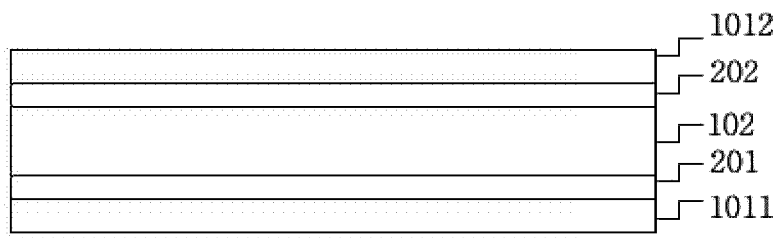
Figure 3:
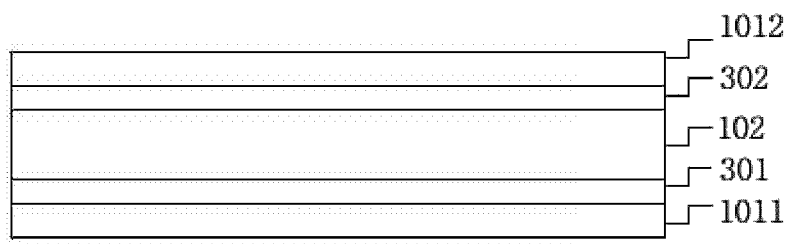

1011, 1012: two substrates facing each other
102: liquid crystal layer
201, 202: alignment films
301, 302: electrode layers Modes of the Invention Hereinafter, the above descriptions will be explained in further detail with reference to examples and comparative examples, but the scope of the present application is not limited by the following descriptions.

1. Evaluation of Conductivity

Conductivity values were measured on liquid crystal devices manufactured as examples and comparative examples at room temperature using an LCR meter (E4980A, Agilent) under conditions of a measurement frequency of 60 Hz and a measurement voltage of 0.5 V. Parallel conductivity was measured on a vertically-aligned liquid crystal layer by applying a vertical voltage, that is, a voltage in the thickness direction, and when needed, vertical conductivity was measured on a horizontally-aligned liquid crystal layer by applying a vertical voltage. A liquid crystal layer of each liquid crystal device was manufactured to have an area of 9 cm$^2$ (width: 3 cm, length: 3 cm) and a thickness of 15 μm for the measurements.

2. Evaluation of Haze and Transmittance

Haze and transmittance were measured on liquid crystal devices manufactured as examples and comparative examples using a haze meter, NDH-5000SP, according to the ASTM D1003 specification. That is, when light is transmitted through a measurement target and incident on the entrance of an integrating sphere, the light is separated into light diffused by the measurement target (DT, the sum of light emitted in all directions by diffusion) and parallel light (PT, light emitted in the forward direction excluding the diffused light), and by concentrating the light on a light receiving device in the integrating sphere, haze can be measured using the concentrated light. That is, in this procedure, total transmitted light (TT) is the sum (DT+PT) of the diffused light (DT) and the parallel light (PT), and haze may be defined as a percentage (haze (%)=100×DT/TT) of the diffused light with respect to the total transmitted light. Also, in the following experimental example, a total transmittance refers to the total transmitted light (TT), and parallel transmittance refers to the parallel light (PT).

PREPARATION EXAMPLE 1

Two polycarbonate (PC) films each having sequentially formed transparent ITO electrode layer and vertical alignment film were separated from each other to allow the vertical alignment films to face each other and to have a cell gap of approximately 15 μm, a liquid crystal composition was injected between the two separated PC films, and their edges were sealed, thereby manufacturing a liquid crystal device having an area of 9 cm$^2$ and a cell gap of 15 μm. The liquid crystal composition used in the experiment included a liquid crystal compound (manufacturer: HCCH, trade name: HNG726200-100) having a refractive index anisotropy of 0.25 and a dielectric anisotropy of −4.0, a dichroic dye (manufacturer: BASF, trade name: X12) and an additive for controlling conductivity (manufacturer: HCCH, trade name: HCM-021) in a weight ratio (HNG726200-100:X12:HCM-021) of 87:10:3. An actual value of the parallel conductivity of the liquid crystal layer manufactured as described above was approximately $7.9 \times 10^{-6}$ S, and a result obtained by converting the above value into that corresponding to a liquid crystal layer having an area of 1 cm$^2$ and a thickness of 1 cm using Formulas 1 to 3 was $1.3 \times 10^{-3}$ μS/cm.

EXPERIMENTAL EXAMPLE 1

Figure 4:
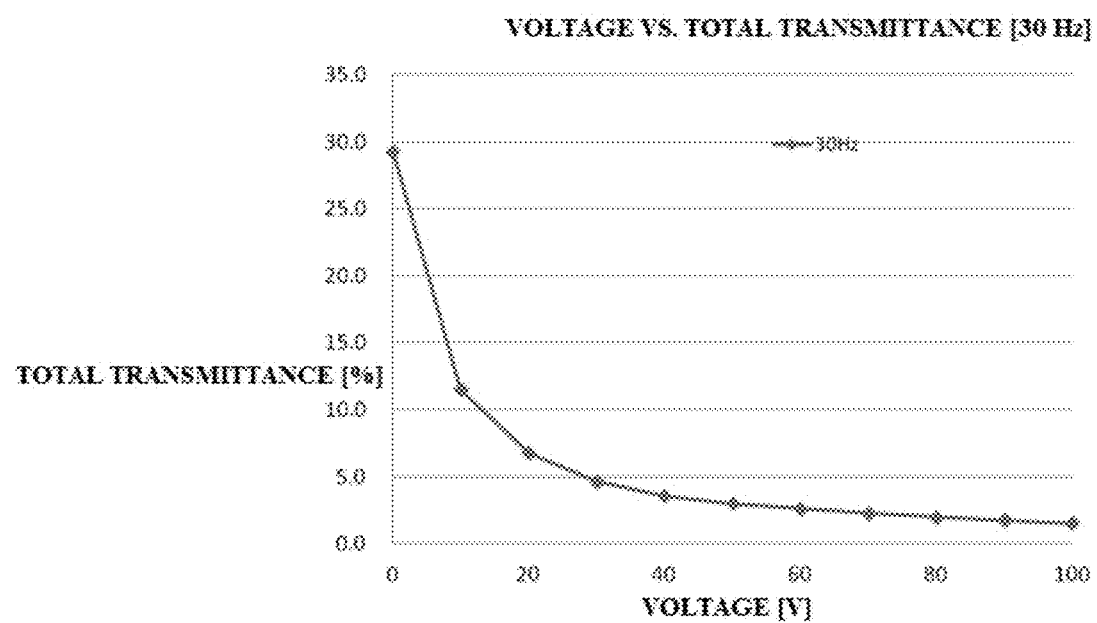
FIGS. 4 to 31 show total transmittance and haze measured in experimental examples.
Figure 5:
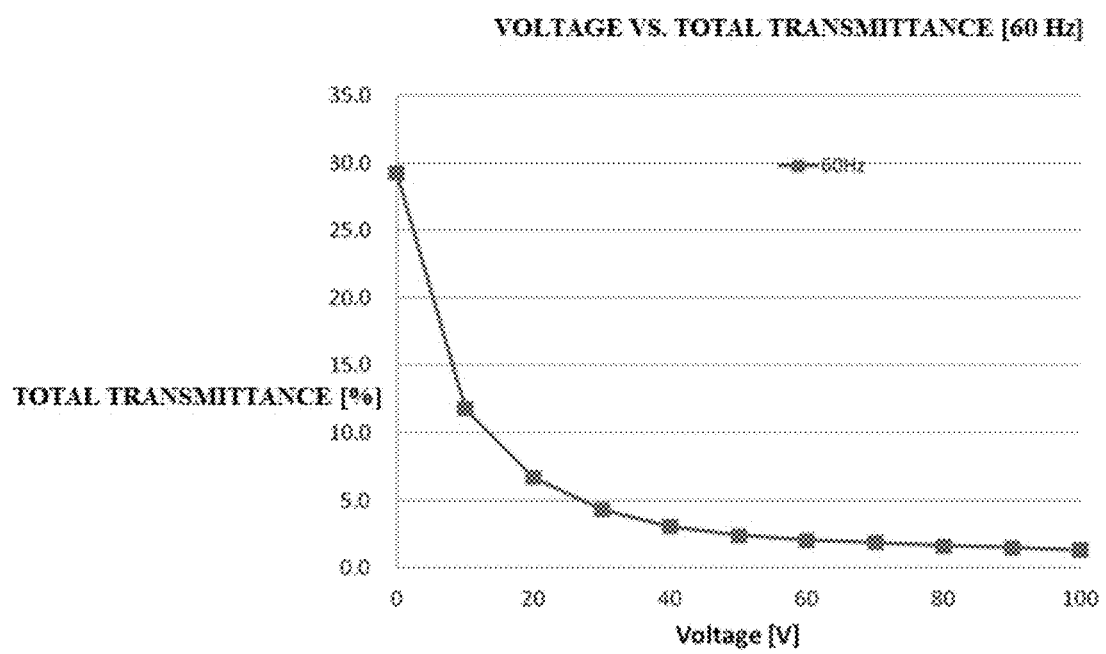
Figure 6:
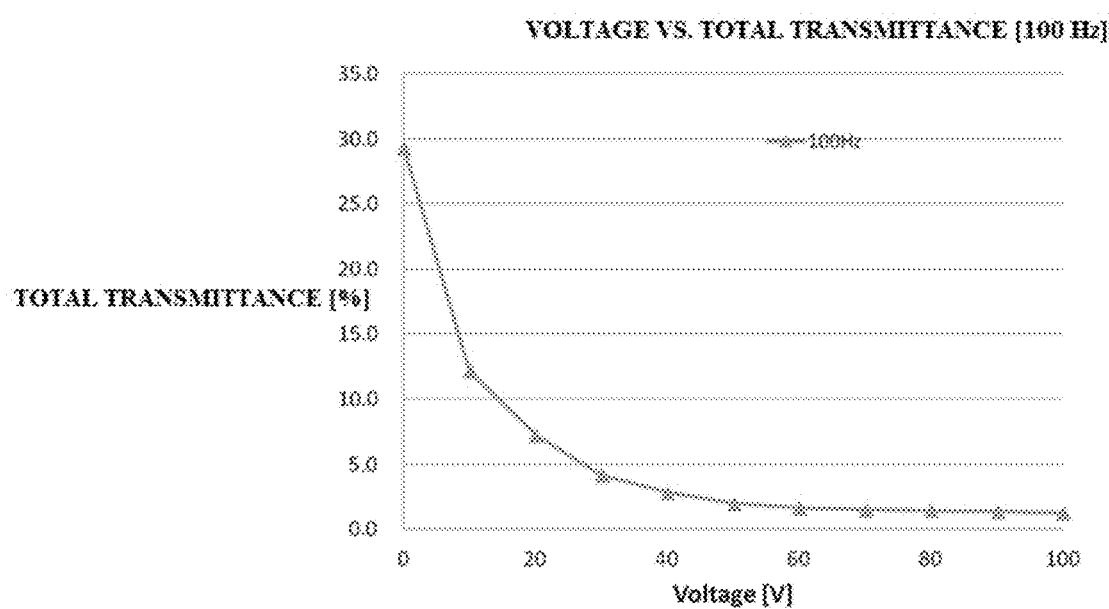
Figure 7:
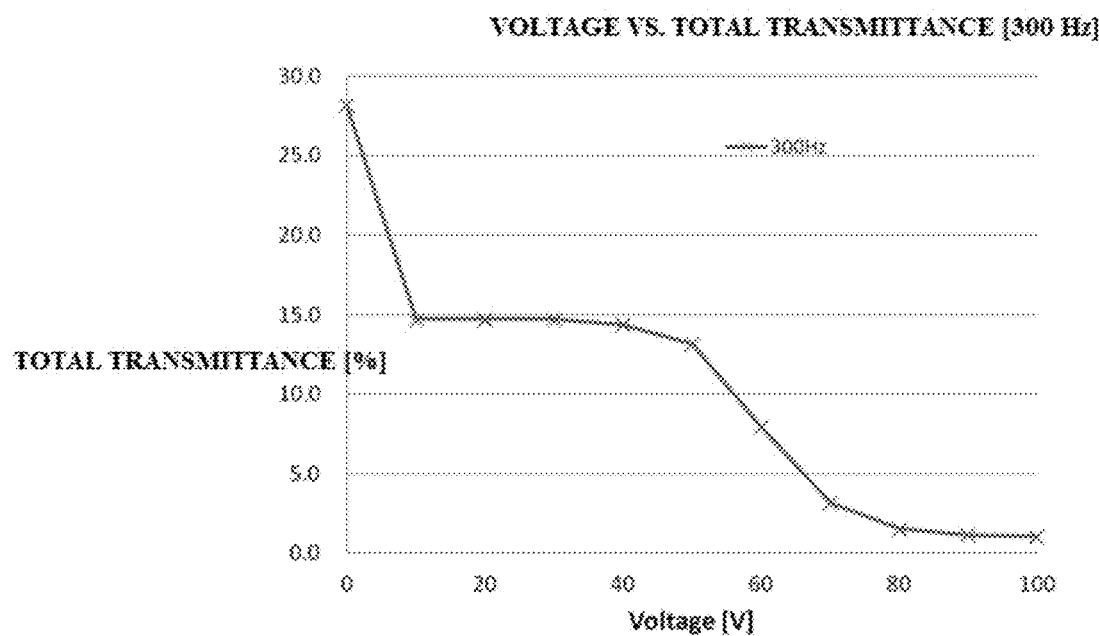
Figure 8:
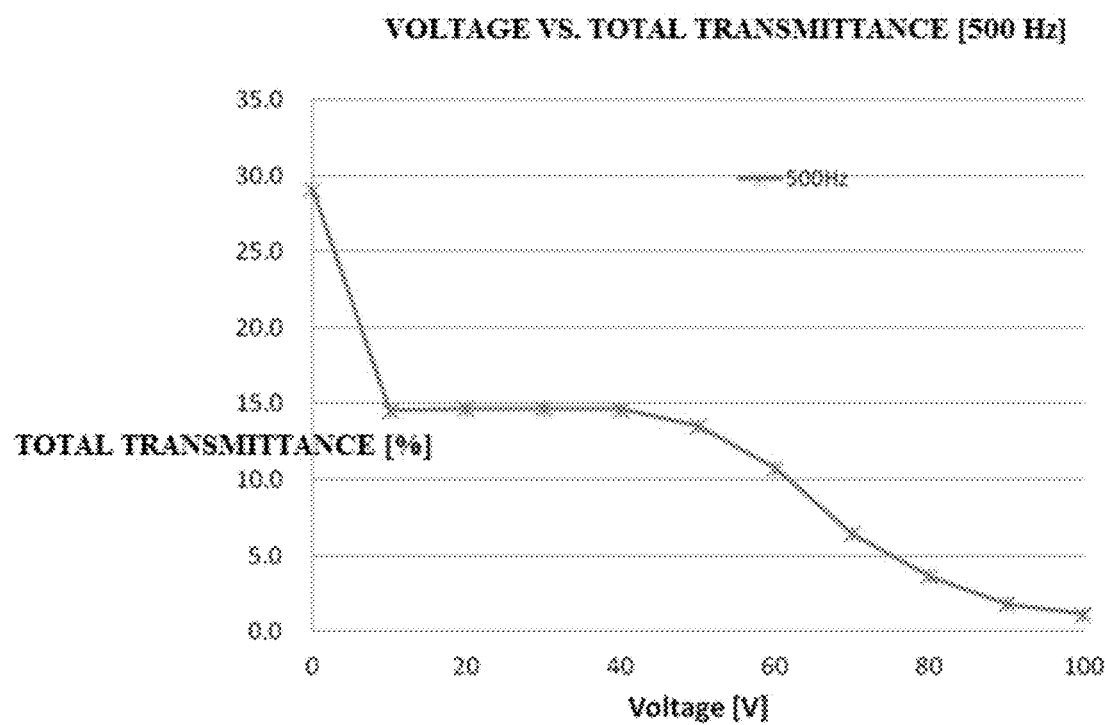
Figure 9:
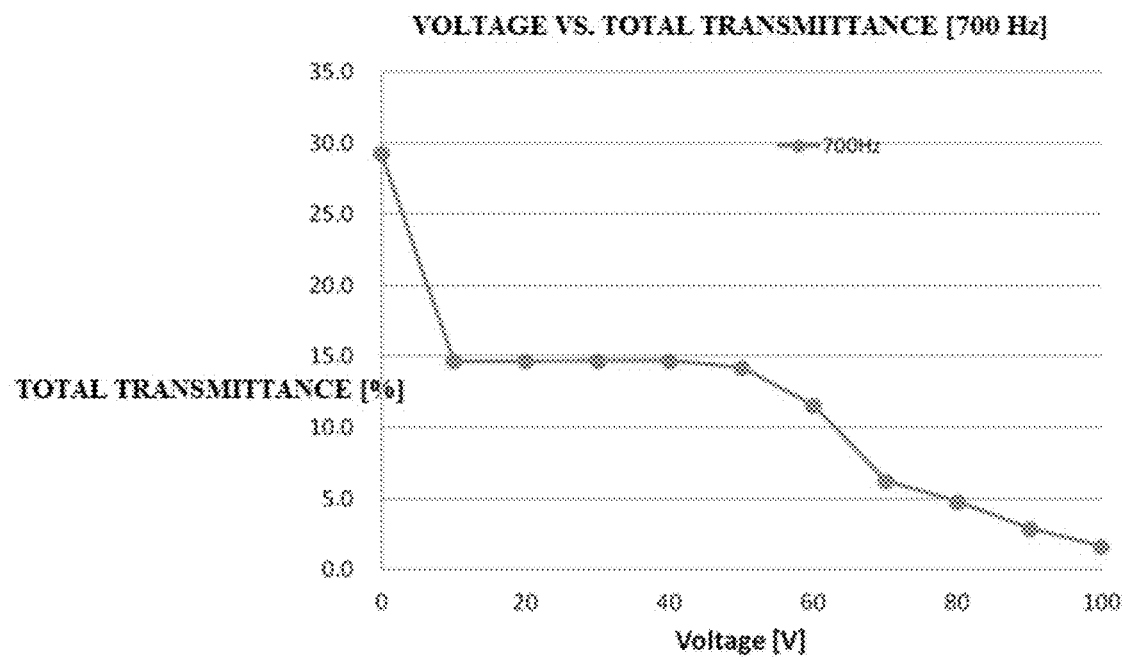
Figure 10:
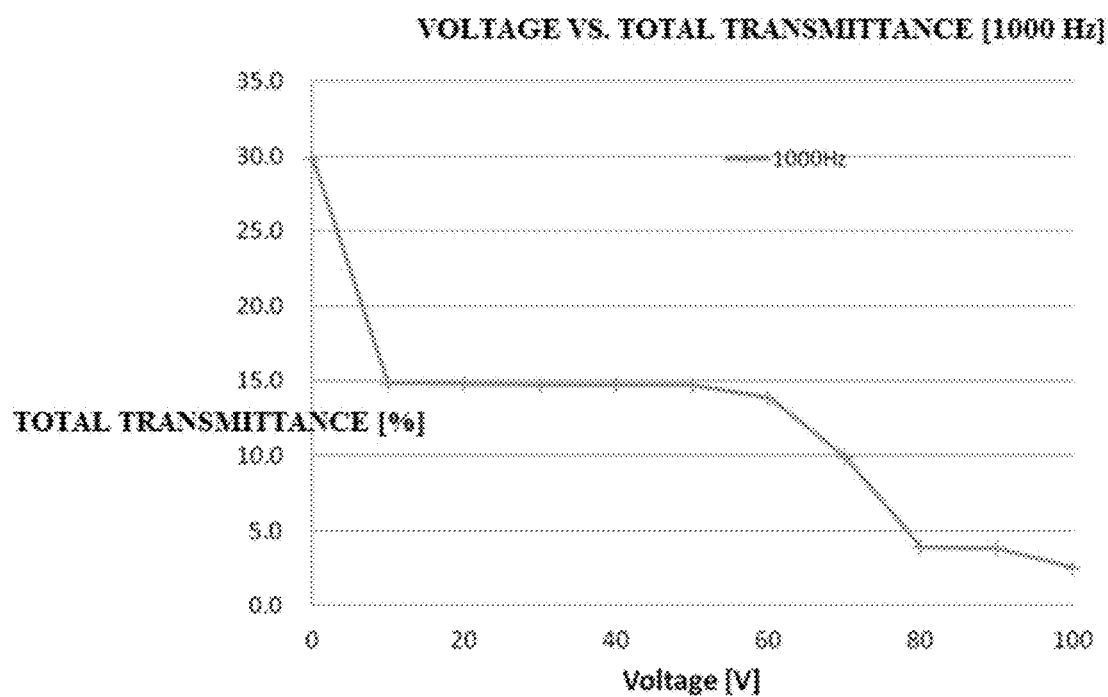
Figure 11:
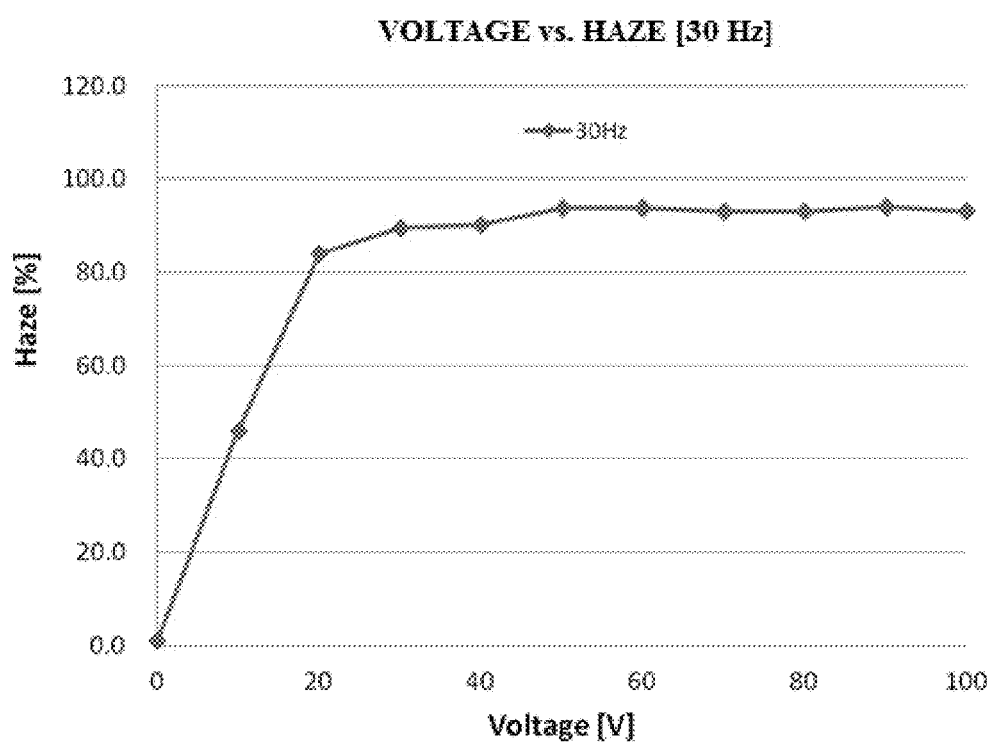
Figure 12:
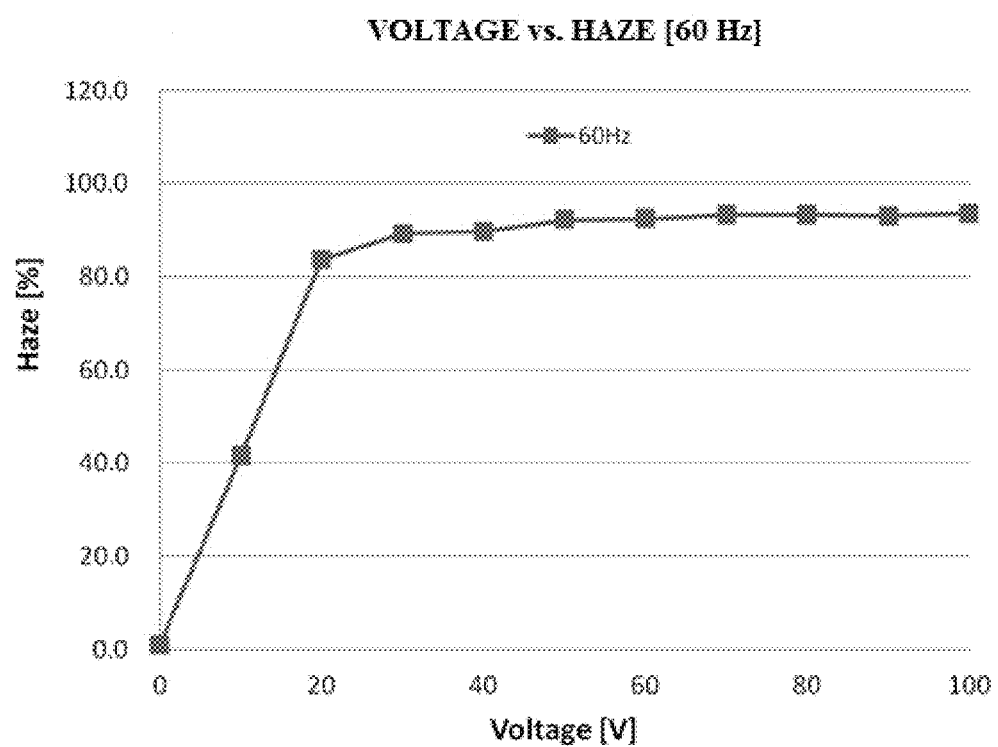
Figure 13:
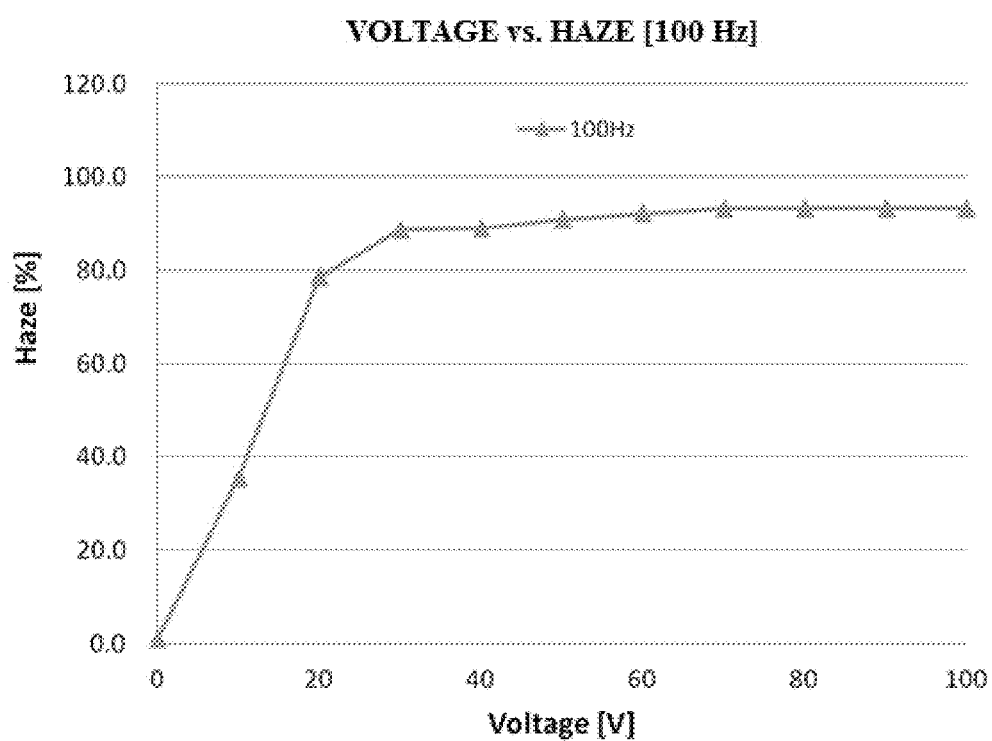
Figure 14:
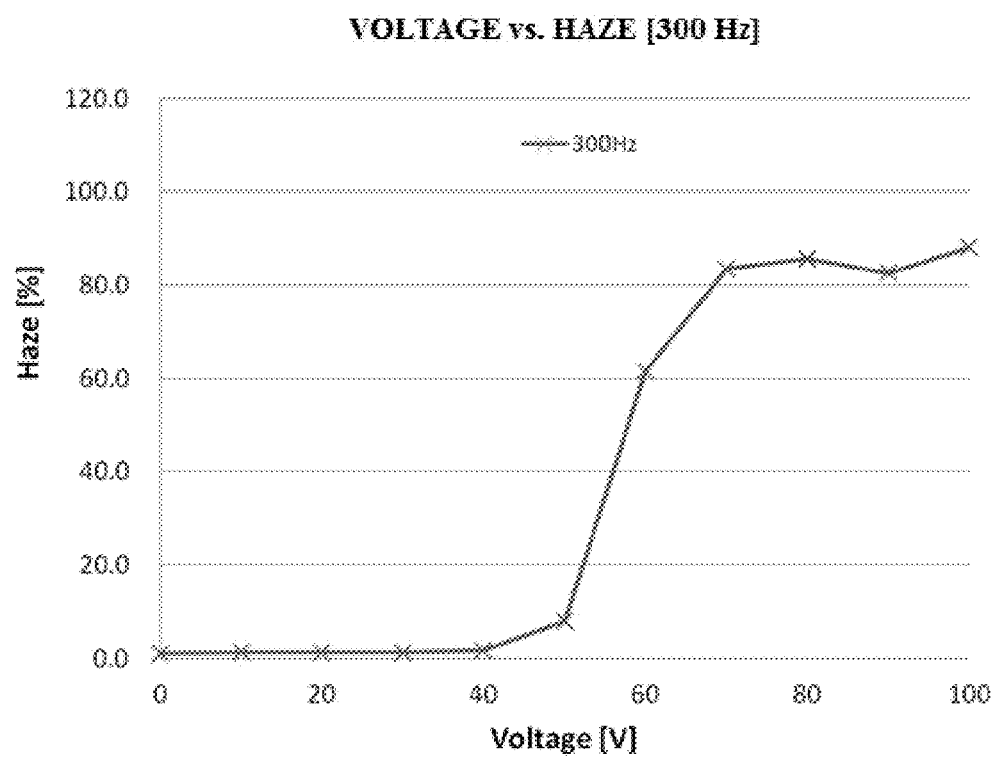
Figure 15:
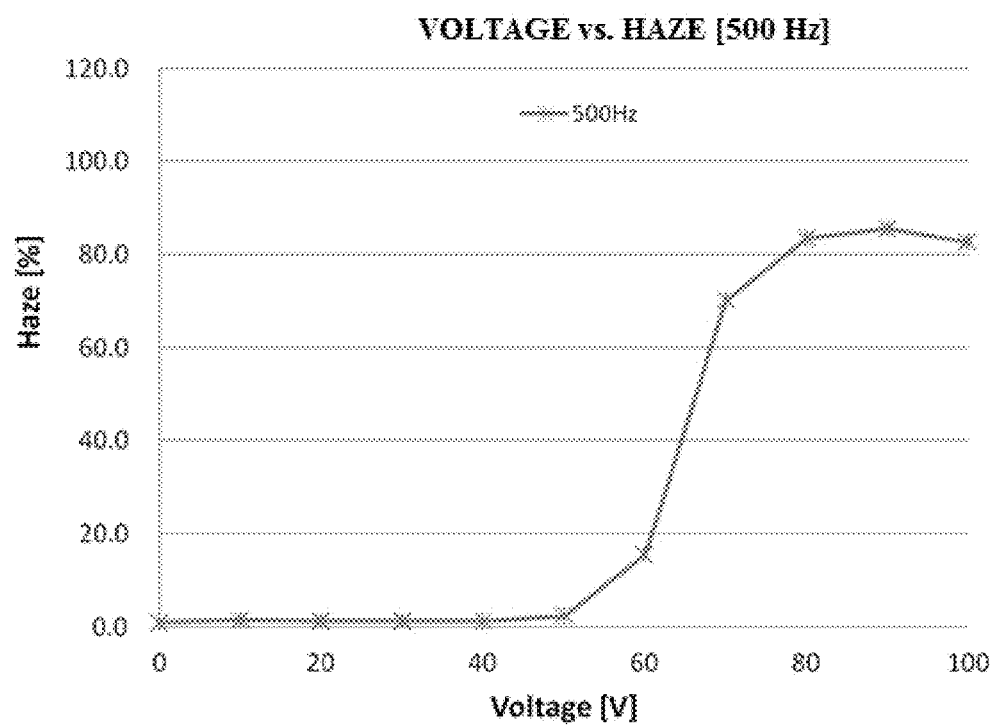
Figure 16:
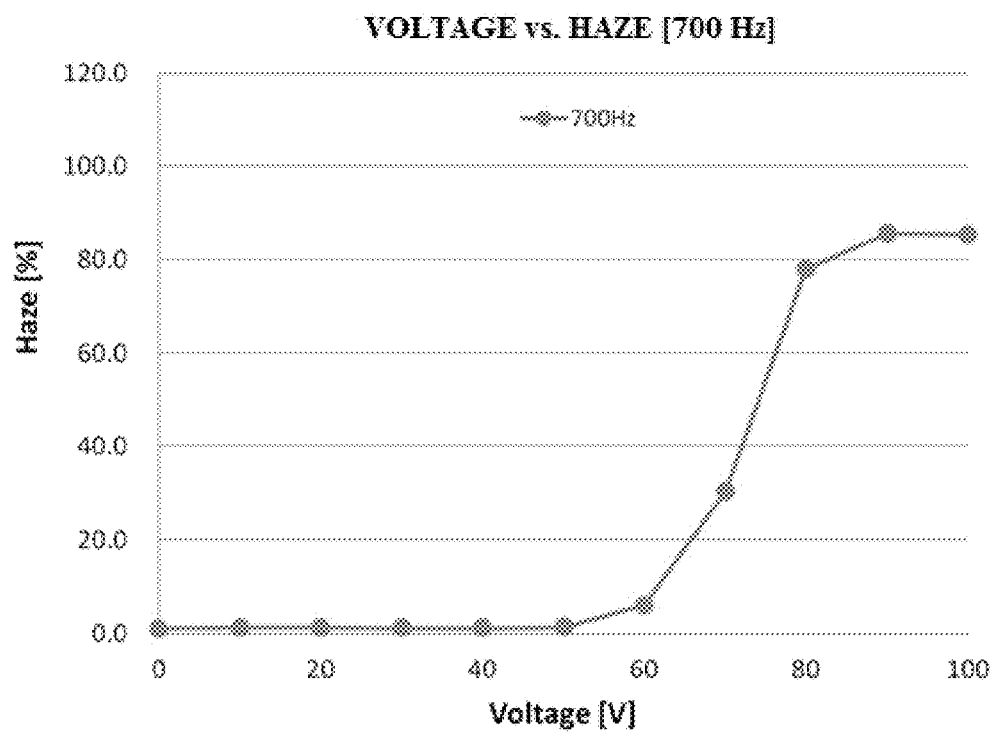
Figure 17:
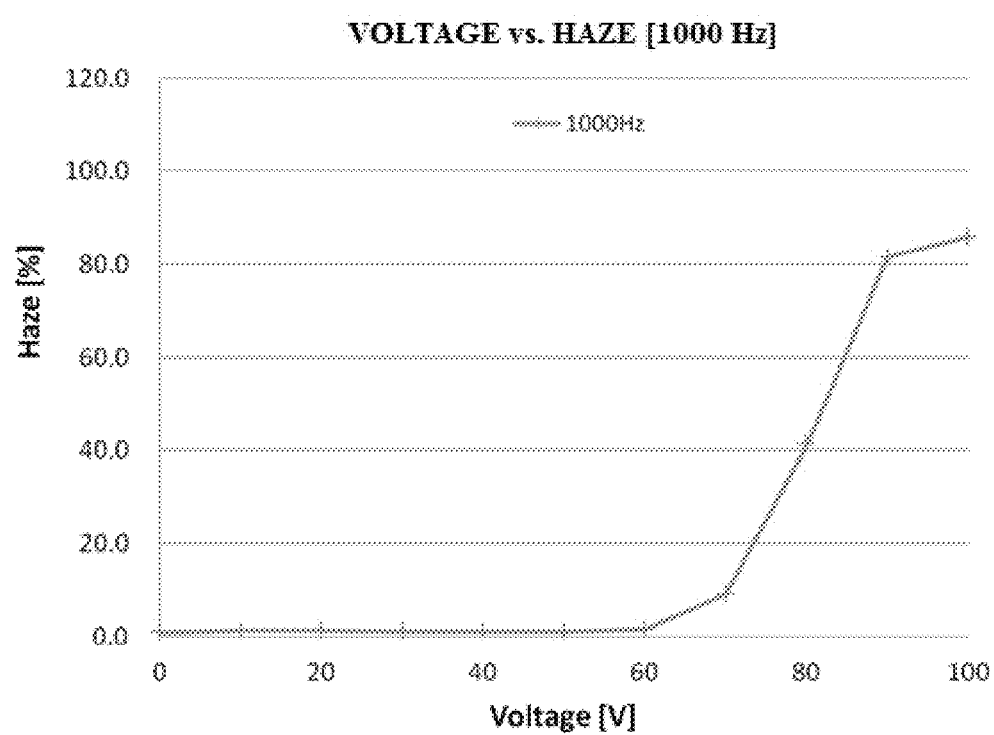

Total transmittance and haze were evaluated on the liquid crystal device manufactured in Preparation Example 1 at a variable driving frequency, and the results are summarized in FIGS. 4 and 17. FIGS. 4 to 10 show total transmittance sequentially measured at 30 Hz, 60 Hz, 100 Hz, 300 Hz, 500 Hz, 700 Hz and 1000 Hz, and FIGS. 11 to 17 show haze sequentially measured at 30 Hz, 60 Hz, 100 Hz, 300 Hz, 500 Hz, 700 Hz and 1000 Hz. Referring to FIGS. 4 to 17, it can be confirmed confirmed that the liquid crystal device of Preparation Example 1 can realize the first and second states at approximately 300 Hz or more and less than 40 V, and transmittance and haze are saturated due to EHDI at a driving frequency of 30 Hz or more and less than 300 Hz and an applied voltage of 60 V.

For such a device, suitable conditions for the first state (the state in which molecules of a liquid crystal compound are vertically aligned), the second state (the state in which molecules of a liquid crystal compound are horizontally aligned) and the third state (the EHDI state) are summarized and listed in Table 1.

TABLE 1

| | Voltage (V) | Frequency (Hz) | Total transmittance (%) | Parallel light transmittance (%) | Haze (%) |
|---|---|---|---|---|---|
| First state | 0 | 0 | 29.5 | 29.0 | 0.9 |
| Second state | 10 | 300 | 14.7 | 14.5 | 1.2 |
| Third state | 60 | 100 | 1.6 | 0.2 | 92.0 |

PREPARATION EXAMPLE 2

A liquid crystal device was prepared in the same manner as in Preparation Example 1, except that a liquid crystal composition used in the experiment included a liquid crystal compound (manufacturer: HCCH, trade name: HNG726200-100) having a refractive index anisotropy of 0.25 and a dielectric anisotropy of −4.0, a dichroic dye (manufacturer: BASF, trade name: X12), and an additive for controlling conductivity (manufacturer: HCCH, trade name: HCM-021) in a weight ratio (HNG726200-100:X12:HCM-021) of 89:10:1. An actual value of the parallel conductivity of the liquid crystal layer manufactured as described above was approximately $1.0 \times 10^{-5}$ S, and a result obtained by converting the above value into a value corresponding to a liquid crystal layer having an area of 1 cm$^2$ and a thickness of 1 cm using Formulas 1 to 3 was 1.7×10$^{-3}$ μS/cm.

EXPERIMENTAL EXAMPLE 2

Figure 18:
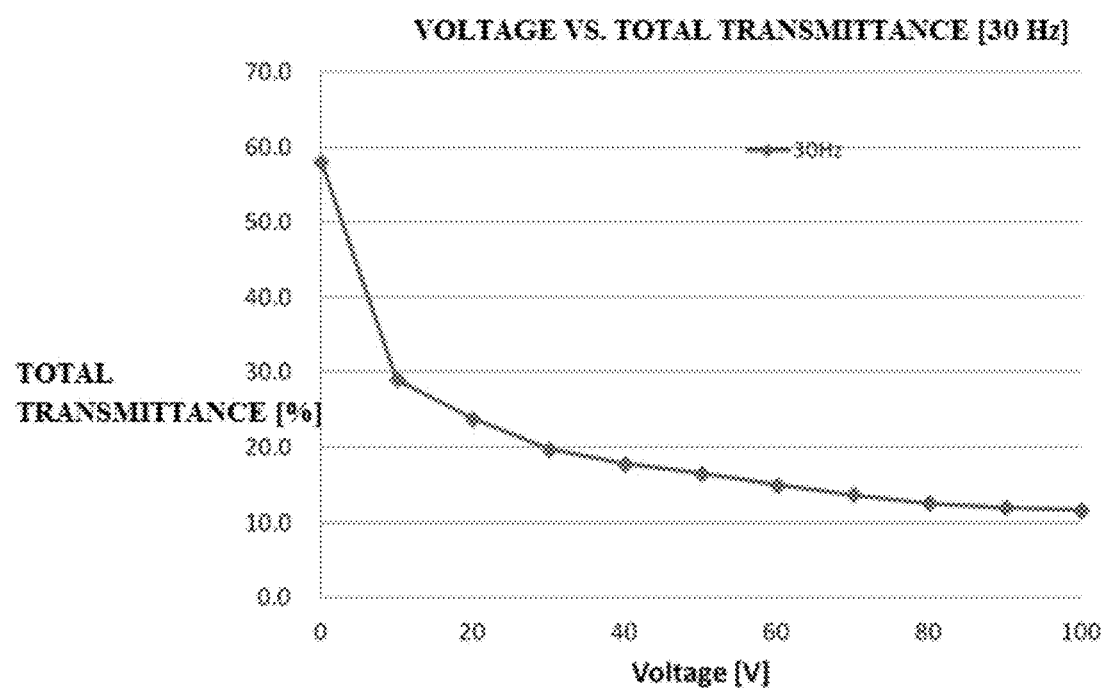
Figure 19:
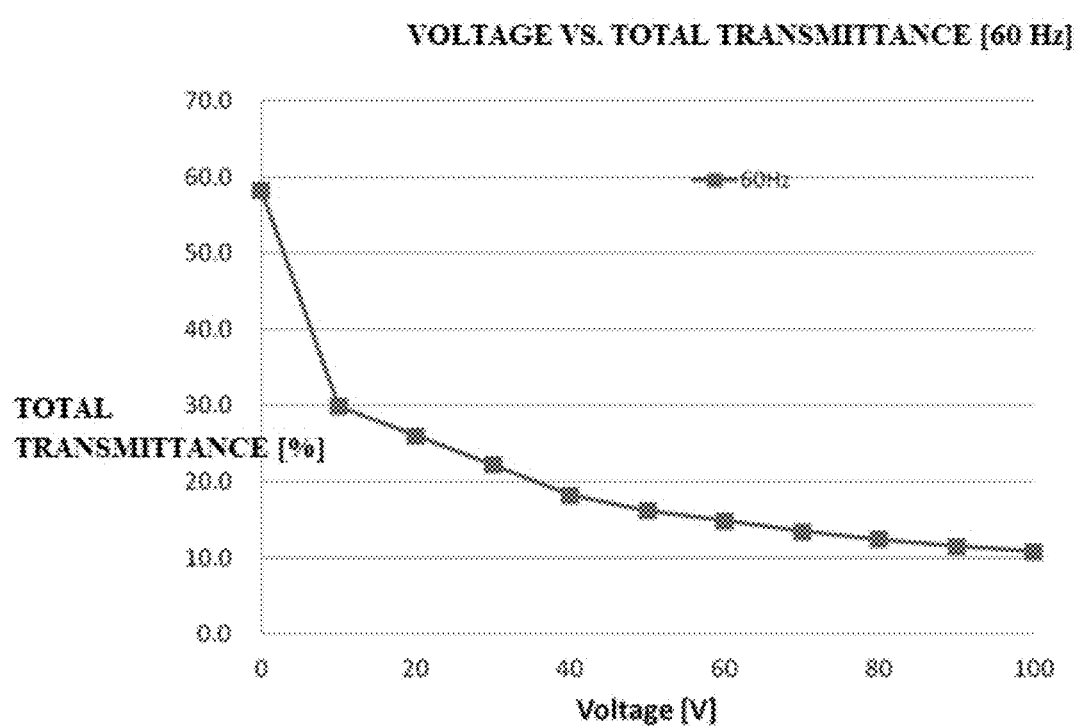
Figure 20:
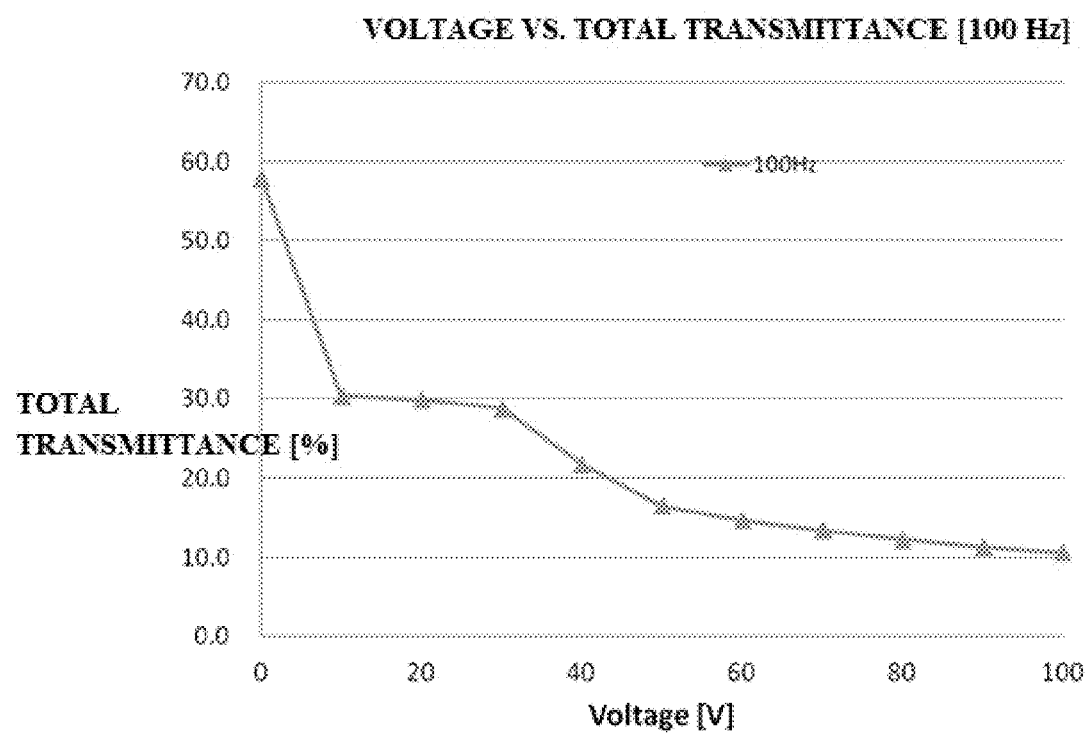
Figure 21:
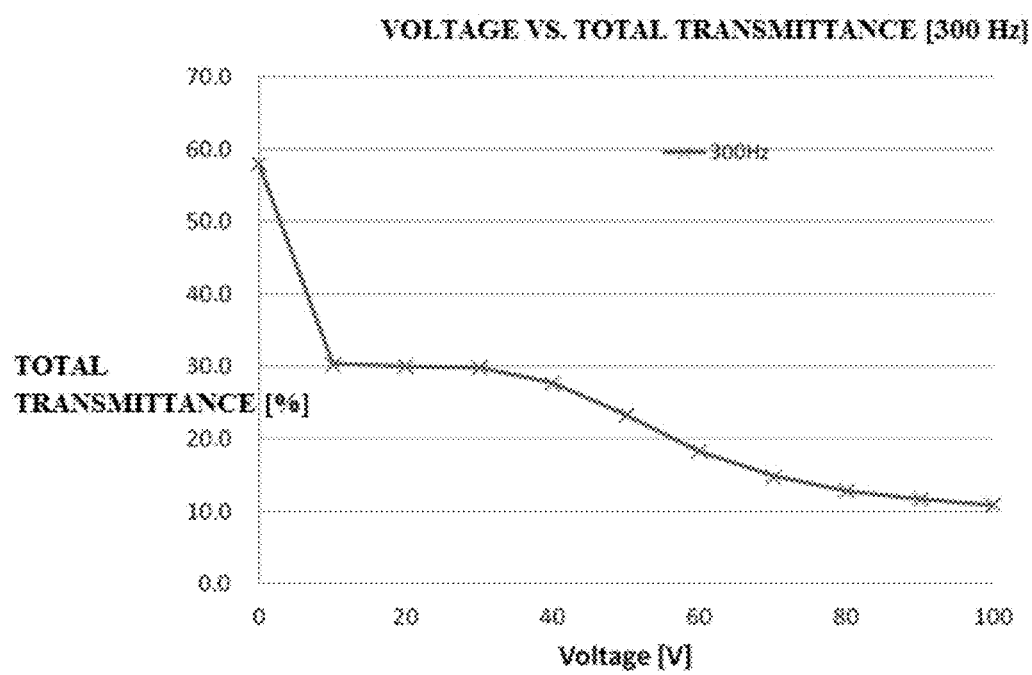
Figure 22:
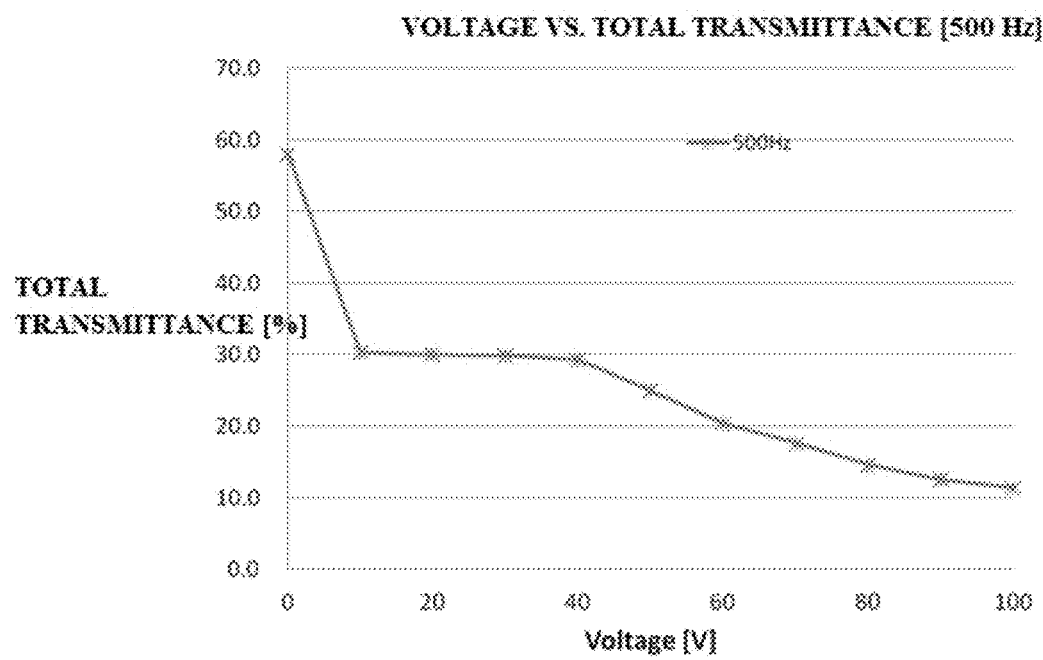
Figure 23:
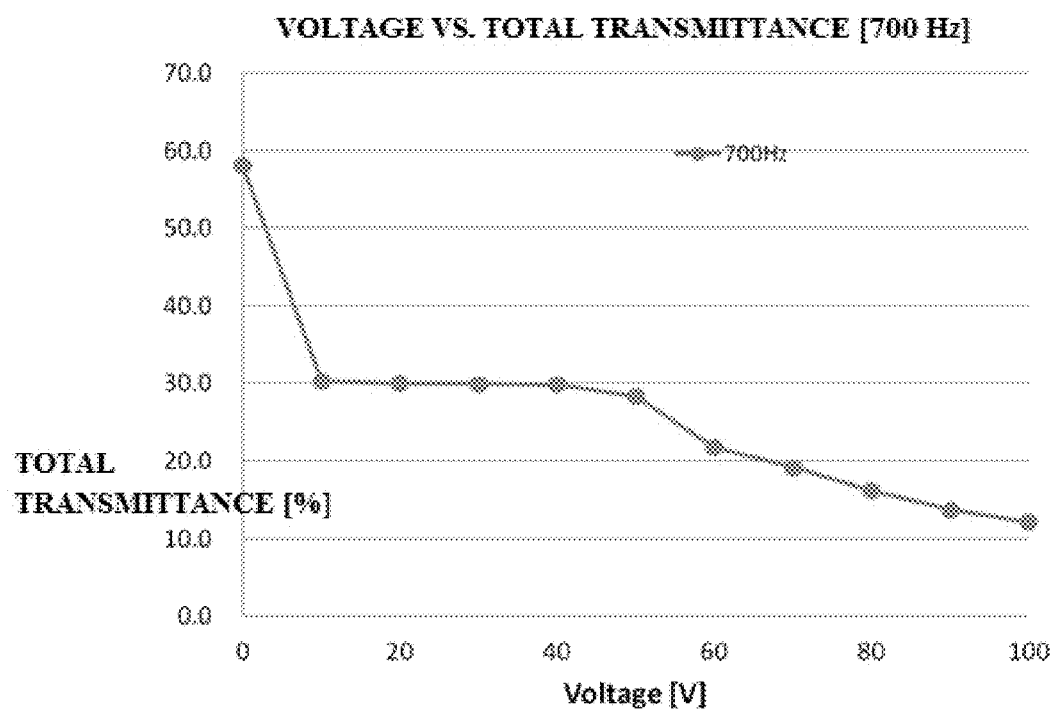
Figure 24:
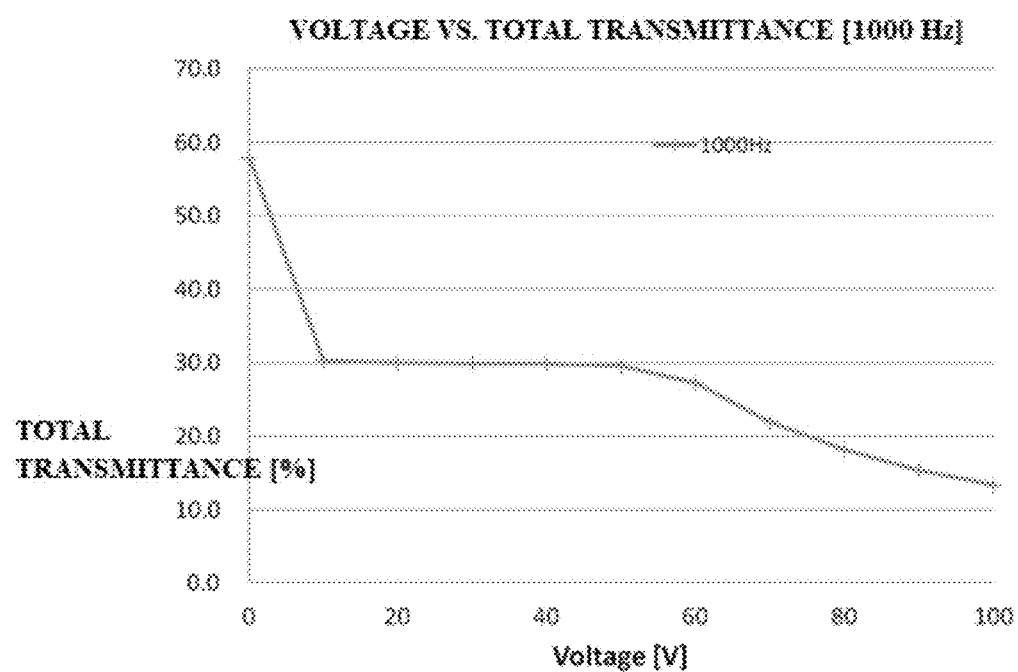
Figure 25:
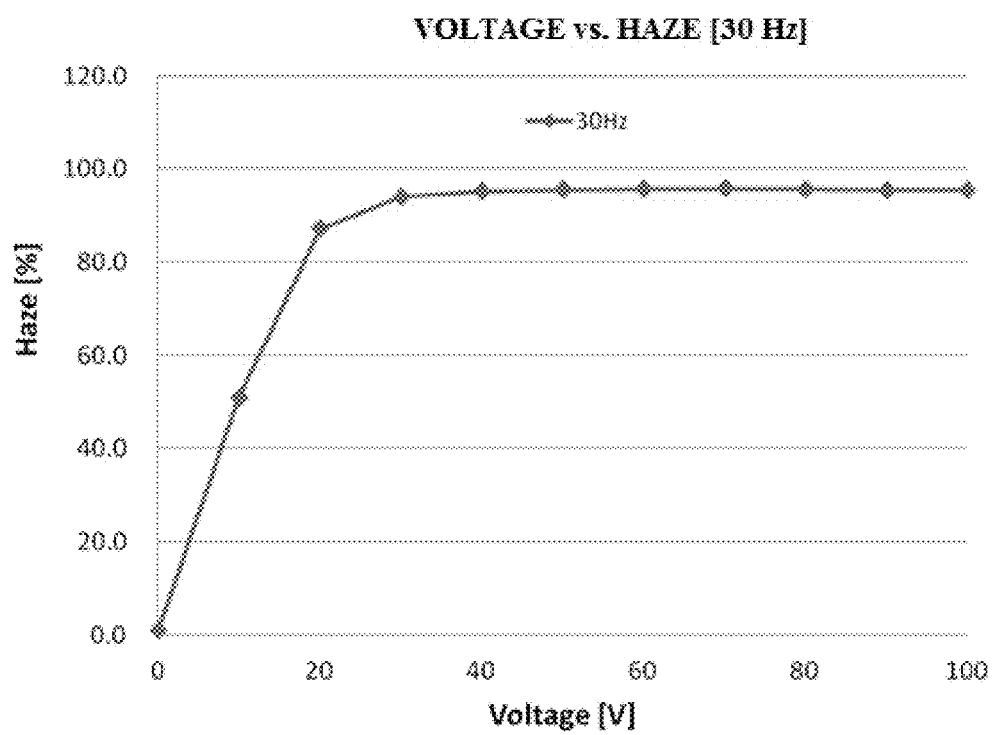
Figure 26:
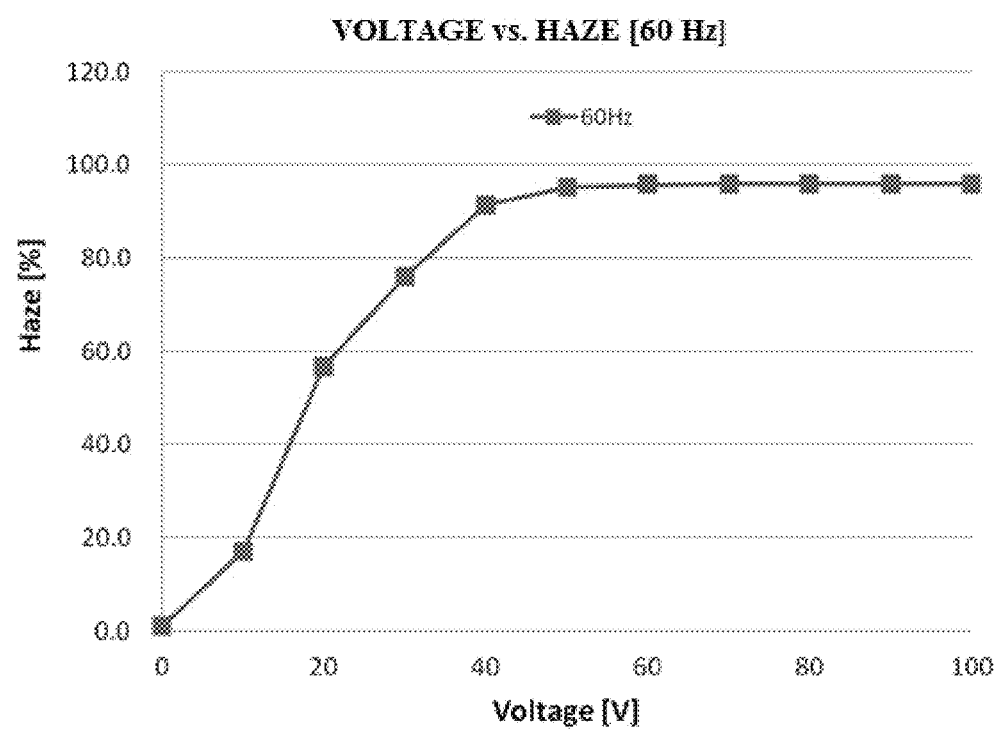
Figure 27:
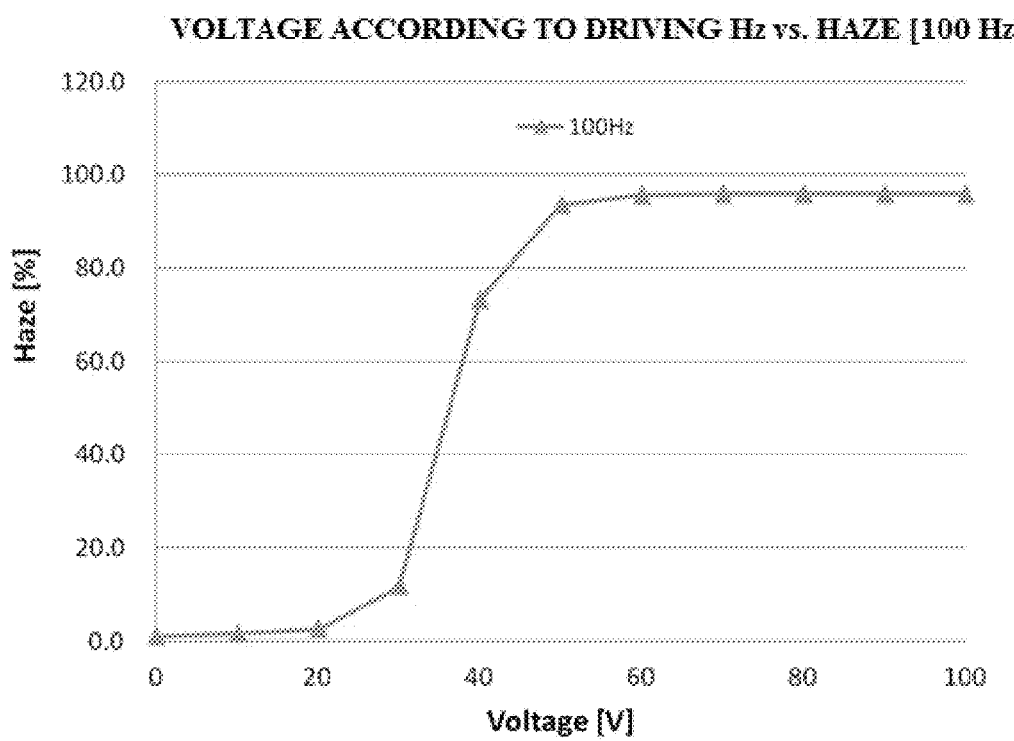
Figure 28:
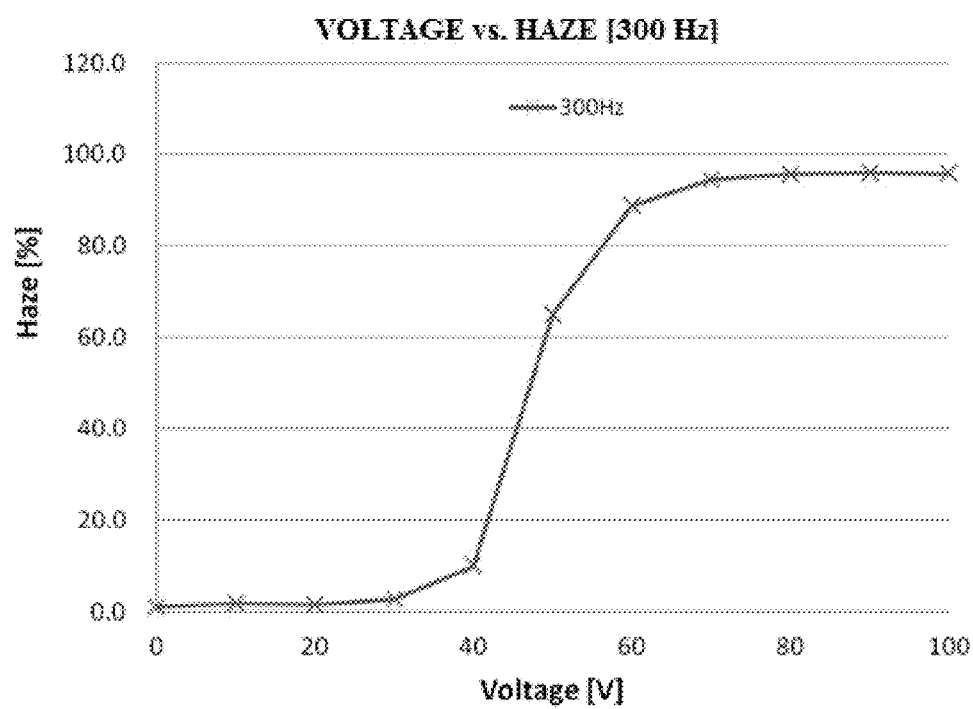
Figure 29:
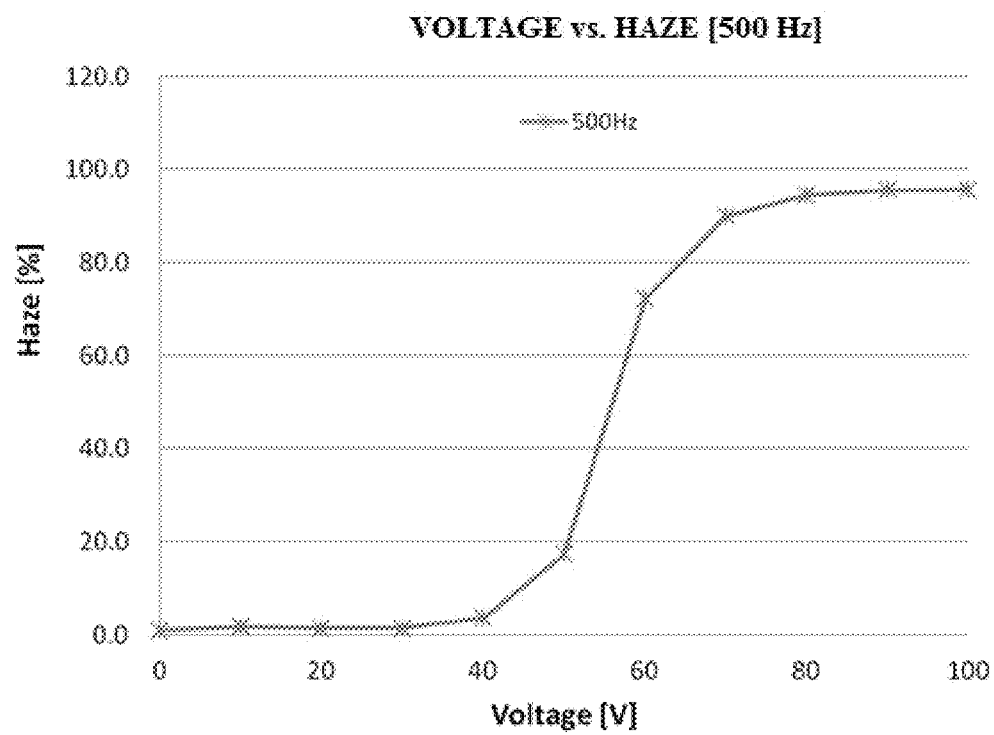
Figure 30:
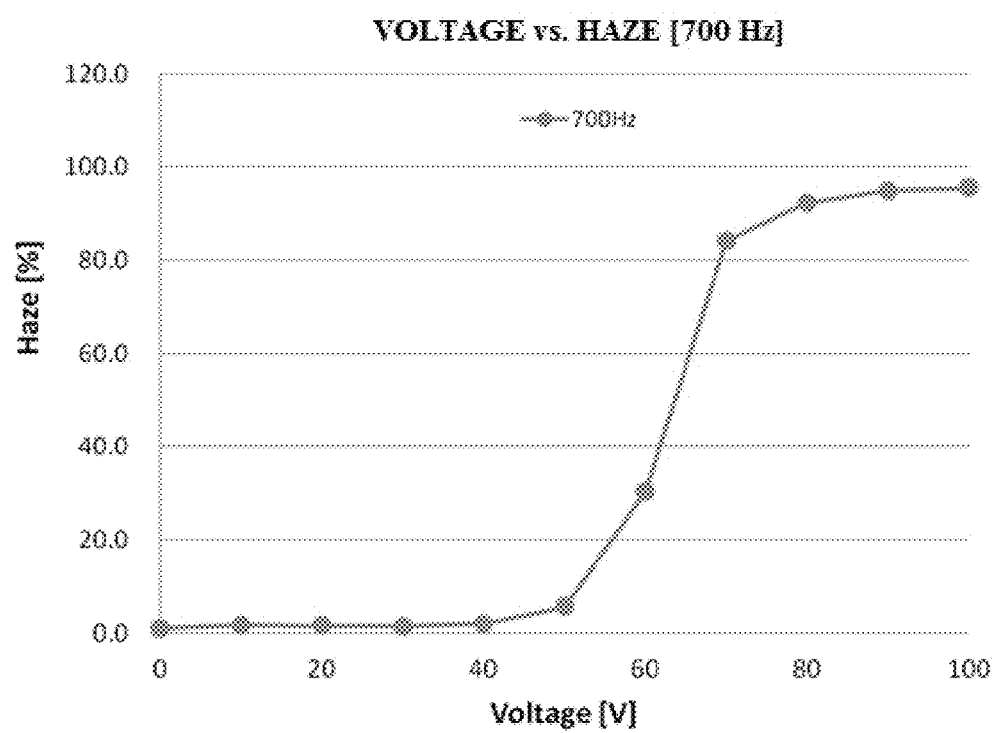
Figure 31:
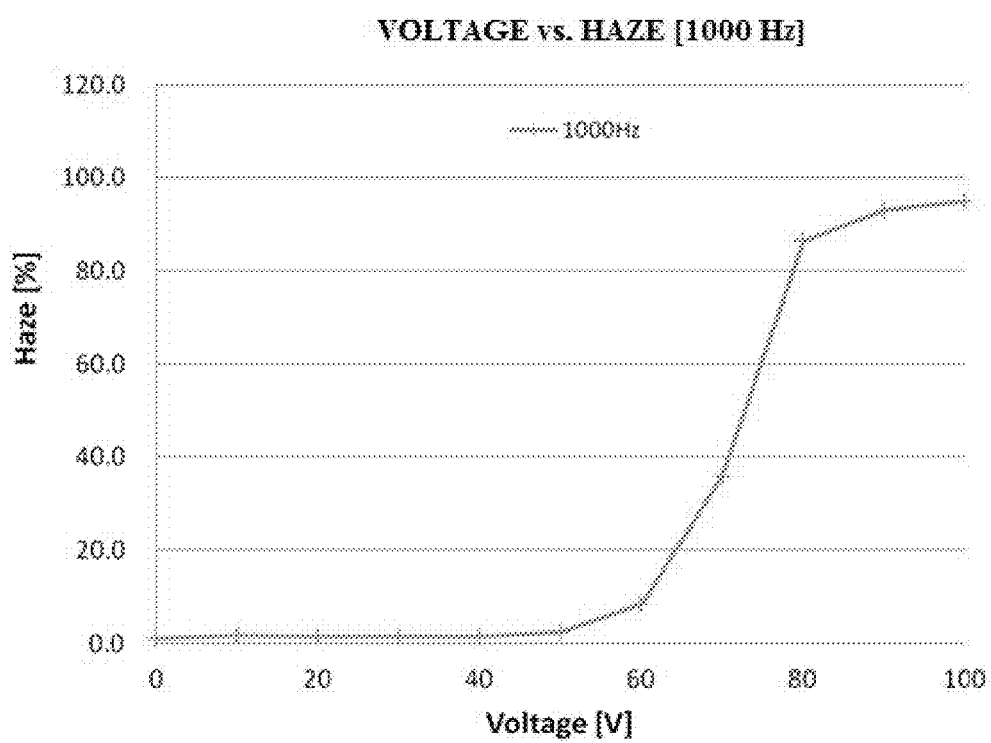

Total transmittance and haze were evaluated on the liquid crystal device manufactured in Preparation Example 1 at variable driving frequencies, and the results are summarized in FIGS. 18 and 31. FIGS. 18 to 24 show total transmittance sequentially values measured at 30 Hz, 60 Hz, 100 Hz, 300 Hz, 500 Hz, 700 Hz and 1000 Hz, and FIGS. 25 to 31 show haze sequentially measured at 30 Hz, 60 Hz, 100 Hz, 300 Hz, 500 Hz, 700 Hz and 1000 Hz. Referring to FIGS. 18 to 31, it was confirmed that the liquid crystal device of Preparation Example 2 can realize first and second states at approximately 100 Hz or more and less than 20 V, and transmittance and haze are saturated due to EHDI at a driving frequency of 30 Hz or more and less than 100 Hz and an applied voltage of 60 V.

For such a device, suitable conditions for the first state (the state in which molecules of a liquid crystal compound are vertically aligned), the second state (the state in which molecules of a liquid crystal compound are horizontally aligned) and the third state (the EHDI state) are summarized and listed in Table 2.

TABLE 2

| | Voltage (V) | Frequency (Hz) | Total transmittance (%) | Parallel light transmittance (%) | Haze (%) |
|---|---|---|---|---|---|
| First state | 0 | 0 | 58.5 | 57.5 | 1 |
| Second state | 10 | 100 | 29.9 | 29.8 | 1.8 |
| Third state | 60 | 30 | 15.0 | 0.7 | 95.6 |

The invention claimed is:

1. A triple state liquid crystal device, comprising:
a liquid crystal layer having a parallel conductivity of 1.0×10$^{-4}$ μS/cm or more,
wherein the liquid crystal layer is capable of switching between a first state, a second state, and a third states,
wherein ionic compounds are present in the liquid crystal layer at 1 percent by weight (wt %) or less,
wherein the value of the parallel conductivity of the liquid crystal layer is based on an area and thickness of the liquid crystal layer, respectively, of 1 cm$^2$ and 1 cm, and the parallel conductivity is measured along a direction of an electric field while a voltage is applied to allow an optical axis of the liquid crystal layer to be parallel to the direction of the electric field at a measurement frequency of 60 Hz and a measurement voltage of 0.5 V,
wherein the first state has a parallel light transmittance of 25% or more and a haze of 5% or less,
wherein the second state has a parallel light transmittance of 15% or less and a haze of 5% or less, and
third state has a parallel light transmittance of 10% or less and a haze of 80% or more.

2. The device of claim 1, wherein the parallel conductivity of the liquid crystal layer is 5.0×10$^{-2}$ μS/cm or less.

3. The device of claim 1, wherein the parallel conductivity of the liquid crystal layer is 3.0×10$^{-2}$ μS/cm or less.

4. The device of claim 1, wherein a ratio (PC/VC) of the parallel conductivity (PC) of the liquid crystal layer to a vertical conductivity (VC) of the liquid crystal layer is 0.2 or more,
wherein the value of the vertical conductivity of the liquid crystal layer is based on an area and thickness of the liquid crystal layer, respectively, of 1 cm$^2$ and 1 cm, and the vertical conductivity is measured along a direction of an electric field while a voltage is applied to allow an optical axis of the liquid crystal layer to be perpendicular to the direction of the electric field at a measurement frequency of 60 Hz and a measurement voltage of 0.5 V.

5. The device of claim 1, wherein a ratio (VC/PC) of a vertical conductivity (VC) of the liquid crystal layer to the parallel conductivity (PC) of the liquid crystal layer is 2.0 or less,
wherein the value of the vertical conductivity of the liquid crystal layer is based on an area and thickness of the liquid crystal layer, respectively, of 1 cm$^2$ and 1 cm, and the vertical conductivity is measured along a direction of an electric field while a voltage is applied to allow an optical axis of the liquid crystal layer to be perpendicular to the direction of the electric field at a measurement frequency of 60 Hz and a measurement voltage of 0.5 V.

6. The device of claim 1, which satisfies Formula A:

$$20 \leq H1/H2 \qquad \text{[Formula A]}$$

where H1 is haze of the triple state liquid crystal device at a frequency of 60 Hz and a voltage of 60 V, and H2 is haze of the triple state liquid crystal device at a frequency of 100 Hz and a voltage of 10 V.

7. The device of claim 1, which satisfies Formula B:

$$5 \leq T1/T2 \qquad \text{[formula b]}$$

where T1 is parallel light transmittance of the triple state liquid crystal device at a frequency of 100 Hz and a voltage of 10 V, and T2 is parallel light transmittance of the triple state liquid crystal device at a frequency of 30 Hz and a voltage of 60V.

8. The device of claim 1, wherein the liquid crystal layer comprises an unreactive liquid crystal compound and a reactive liquid crystal compound,
wherein the reactive liquid crystal compound is reactive mesogen.

9. The device of claim 8, wherein the liquid crystal layer comprises the reactive liquid crystal compound at 1 to 30 parts by weight with respect to 100 parts by weight of the unreactive liquid crystal compound.

10. The device of claim 1, wherein the liquid crystal layer does no substantially include the ionic compound.

11. The device of claim 1, wherein the liquid crystal layer is vertically aligned in the first state.

12. The device of claim 1, wherein the liquid crystal layer is horizontally, vertically, twist or hybrid aligned in the second state.

13. The device of claim 1, wherein the liquid crystal layer is in an electrohydrodynamic instability state in the third state.

14. A light modulator, comprising:
the triple state liquid crystal device of claim 1.

* * * * *